(12) United States Patent
Saito et al.

(10) Patent No.: US 8,585,945 B2
(45) Date of Patent: Nov. 19, 2013

(54) METHOD OF PRODUCING HONEYCOMB STRUCTURE AND HONEYCOMB STRUCTURE

(75) Inventors: Jyo Saito, Ibi-gun (JP); Hiroshi Yamada, Ibi-gun (JP)

(73) Assignee: Ibiden Co., Ltd., Ogaki-shi (JP)

( * ) Notice: Subject to any disclaimer, the term of this patent is extended or adjusted under 35 U.S.C. 154(b) by 833 days.

(21) Appl. No.: 11/927,225

(22) Filed: Oct. 29, 2007

(65) Prior Publication Data
US 2008/0241466 A1 Oct. 2, 2008

(30) Foreign Application Priority Data

Mar. 29, 2007 (WO) .................. PCT/JP2007/056972
Sep. 12, 2007 (JP) ................... 2007-236676

(51) Int. Cl.
*C04B 38/10* (2006.01)

(52) U.S. Cl.
USPC .......................................... 264/45.1; 156/78

(58) Field of Classification Search
USPC ................................ 156/69, 77, 78; 264/45.1
See application file for complete search history.

(56) References Cited

U.S. PATENT DOCUMENTS

| | | | |
|---|---|---|---|
| 7,396,586 B2 | 7/2008 | Ohno et al. | |
| 2005/0076626 A1 | 4/2005 | Kudo et al. | |
| 2005/0109023 A1* | 5/2005 | Kudo et al. | 60/311 |
| 2005/0178098 A1* | 8/2005 | Ono et al. | 55/523 |
| 2006/0021310 A1 | 2/2006 | Ohno et al. | |
| 2006/0051556 A1 | 3/2006 | Ohno et al. | |
| 2006/0101747 A1 | 5/2006 | Masukawa et al. | |
| 2007/0178275 A1 | 8/2007 | Takahashi | |
| 2007/0187651 A1 | 8/2007 | Naruse et al. | |
| 2007/0196620 A1 | 8/2007 | Ohno et al. | |
| 2007/0199205 A1 | 8/2007 | Hoshino et al. | |
| 2007/0212517 A1 | 9/2007 | Ohno et al. | |
| 2007/0235895 A1 | 10/2007 | Yamamura et al. | |
| 2007/0243283 A1 | 10/2007 | Yamamura et al. | |
| 2007/0262497 A1 | 11/2007 | Yamamura et al. | |

(Continued)

FOREIGN PATENT DOCUMENTS

| | | |
|---|---|---|
| EP | 1479881 | 11/2004 |
| JP | 11-322877 | * 5/1998 |

(Continued)

OTHER PUBLICATIONS

Japanese Office Action for corresponding JP Application No. 2007-236676, Sep. 13, 2011.

*Primary Examiner* — Richard Crispino
*Assistant Examiner* — Martin Rogers
(74) *Attorney, Agent, or Firm* — Ditthavong Mori & Steiner, P.C.

(57) ABSTRACT

A method of producing a honeycomb structure includes a step of forming a ceramic block by bonding a plurality of honeycomb units that have a plurality of cells partitioned by cell walls using a bonding layer, or steps of forming a ceramic block of a single honeycomb unit and providing a coating layer on an outer peripheral portion of the ceramic block. The bonding layer or coating layer is provided as a paste of a bonding material or a coating material including particles of a foaming material having a diameter in a range of approximately 1 μm to approximately 50 μm. The method further includes a step of blowing up the foaming material, and a step of evaporating the foaming material and forming bubble marks having a diameter in a range of approximately 100 μm to approximately 300 μm.

15 Claims, 12 Drawing Sheets

(56) References Cited

U.S. PATENT DOCUMENTS

| | | |
|---|---|---|
| 2007/0262498 A1 | 11/2007 | Saijo et al. |
| 2008/0067725 A1 | 3/2008 | Naruse et al. |
| 2008/0083202 A1 | 4/2008 | Kunieda et al. |
| 2008/0084010 A1 | 4/2008 | Naruse et al. |
| 2008/0088072 A1 | 4/2008 | Kobayashi |
| 2008/0106008 A1 | 5/2008 | Kasai et al. |
| 2008/0106009 A1 | 5/2008 | Naruse et al. |
| 2008/0115597 A1 | 5/2008 | Ohno et al. |
| 2008/0116200 A1 | 5/2008 | Kawai et al. |
| 2008/0120950 A1 | 5/2008 | Ohno et al. |
| 2008/0136053 A1 | 6/2008 | Kuribayashi et al. |
| 2008/0136062 A1 | 6/2008 | Kasai et al. |
| 2008/0138567 A1 | 6/2008 | Ninomiya et al. |
| 2008/0150200 A1 | 6/2008 | Tajima |
| 2008/0157445 A1 | 7/2008 | Kawai et al. |
| 2008/0160249 A1 | 7/2008 | Makino |
| 2008/0174039 A1 | 7/2008 | Saijo et al. |
| 2008/0179781 A1 | 7/2008 | Iwata |
| 2008/0190081 A1 | 8/2008 | Oshimi |
| 2008/0190083 A1 | 8/2008 | Oshimi |
| 2008/0197544 A1 | 8/2008 | Saijo et al. |
| 2008/0211127 A1 | 9/2008 | Naruse et al. |
| 2008/0213485 A1 | 9/2008 | Shibata |
| 2008/0236115 A1 | 10/2008 | Sakashita |
| 2008/0236122 A1 | 10/2008 | Ito |
| 2008/0236724 A1 | 10/2008 | Higuchi |
| 2008/0237428 A1 | 10/2008 | Kobayashi et al. |
| 2008/0237942 A1 | 10/2008 | Takamatsu |
| 2008/0241015 A1 | 10/2008 | Kudo et al. |
| 2008/0241444 A1 | 10/2008 | Oshimi |
| 2008/0251977 A1 | 10/2008 | Naruse et al. |
| 2008/0284067 A1 | 11/2008 | Naruse et al. |
| 2008/0305259 A1 | 12/2008 | Saijo |
| 2008/0318001 A1 | 12/2008 | Sakakibara |
| 2009/0004431 A1 | 1/2009 | Ninomiya |
| 2009/0107879 A1 | 4/2009 | Otsuka et al. |
| 2009/0130378 A1 | 5/2009 | Imaeda et al. |

FOREIGN PATENT DOCUMENTS

| | | |
|---|---|---|
| JP | 11-322877 | * 11/1999 |
| JP | 2004-051674 | 2/2004 |
| JP | 2005-199179 | 7/2005 |
| JP | 2006-326831 | 12/2006 |
| WO | WO 03/067041 | 8/2003 |
| WO | WO 03/067042 | 8/2003 |
| WO | WO 2005/018893 | 3/2005 |
| WO | WO 2005/047209 | 5/2005 |
| WO | WO 2005/047210 | 5/2005 |
| WO | WO 2005/089901 | 9/2005 |
| WO | WO 2005/090262 | 9/2005 |

* cited by examiner

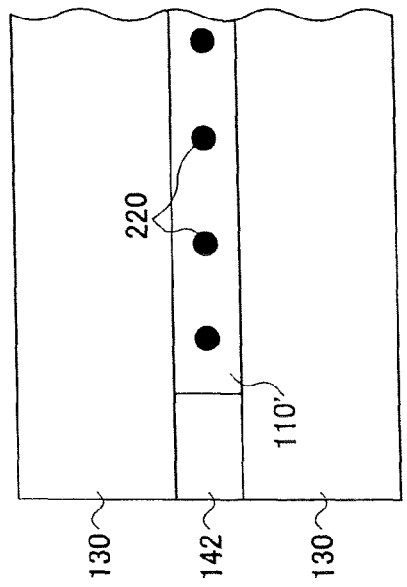
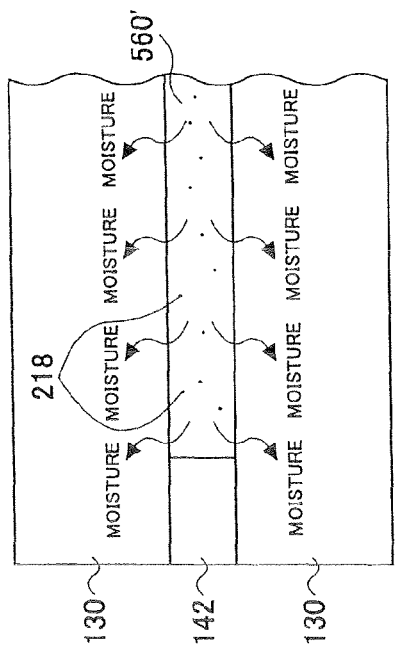 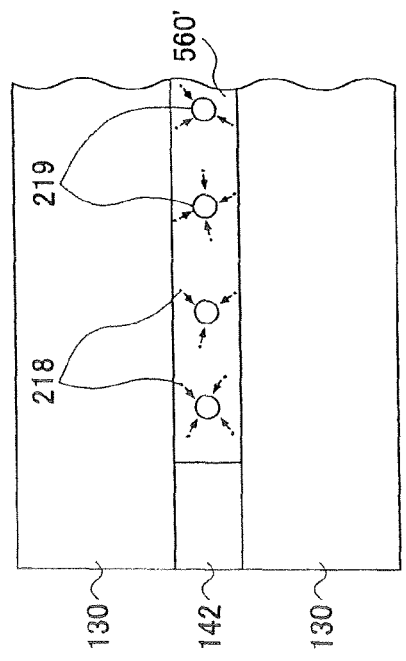

FIG.14

| | FOAMING MATERIAL | DIAMETER OF FOAMING MATERIAL (μm) | AMOUNT OF FOAMING MATERIAL (wt%) | BUBBLE SIZE WITHIN BONDING LAYER (μm) | BUBBLE SIZE WITHIN COATING LAYER (μm) | BREAKING LOAD (kgf) |
|---|---|---|---|---|---|---|
| Ex1 | MICRO CAPSULE | 10~50 | 0.5 | 100~300 | 100~300 | 18.2 |
| Ex2 | MICRO CAPSULE | 10~50 | 1.0 | 100~300 | 100~300 | - |
| Ex3 | MICRO CAPSULE | 10~50 | 4.0 | 100~300 | 100~300 | 22.0 |
| Ex4 | MICRO CAPSULE | 10~50 | 8.0 | 100~300 | 100~300 | - |
| Ex5 | MICRO CAPSULE | 10~50 | 10.0 | 100~300 | 100~300 | 24.6 |
| Ex6 | MICRO CAPSULE | 10~50 | 15.0 | 100~300 | 100~300 | 14.9 |
| Ex7 | FOAMING AS RESIN | 10~30 | 0.5 | 100~300 | 100~300 | - |
| Ex8 | FOAMING AS RESIN | 10~30 | 4.0 | 100~300 | 100~300 | - |
| Ex9 | FOAMING AS RESIN | 10~30 | 10.0 | 100~300 | 100~300 | - |
| CEx1 | NONE | - | 0 | 900< (LARGEST BUBBLE) | 900< (LARGEST BUBBLE) | 9.0 |
| CEx2 | MICRO CAPSULE | 60~100 | 1.0 | 500~700 (LARGEST BUBBLE) | 500~700 (LARGEST BUBBLE) | 8.5 |
| CEx3 | MICRO CAPSULE | 100~150 | 1.0 | 900< (LARGEST BUBBLE) | 900< (LARGEST BUBBLE) | 7.6 |

METHOD OF PRODUCING HONEYCOMB STRUCTURE AND HONEYCOMB STRUCTURE

CROSS-REFERENCE TO RELATED APPLICATIONS

This application claims priority under 35 U.S.C. §119 to a PCT International Application No. PCT/JP2007/056972 filed Mar. 29, 2007, the contents of which are incorporated herein by reference in their entirety.

BACKGROUND OF THE INVENTION

1. Field of the Invention

The present invention relates to methods of producing honeycomb structures and honeycomb structures.

2. Discussion of the Background

Conventionally, various exhaust gas treating apparatuses have been proposed and reduced to practice for internal combustion engines of vehicles, construction equipment and the like. The general exhaust gas treating apparatus is provided with a casing made of a metal or the like, for example, at an intermediate part of an exhaust pipe that is connected to an exhaust gas manifold of the engine, and the honeycomb structure is arranged inside this casing. The honeycomb structure captures particulates included within the exhaust gas, and functions as a filter (DPF: Diesel Particulate Filter) that filters the exhaust gas or, as a catalyst carrier that converts a toxic gas component or the like within the exhaust gas by the catalytic reaction.

For example, in the case where the honeycomb structure is used as the DPF, the honeycomb structure is formed by a plurality of pillar cells that extend in a longitudinal direction of the honeycomb structure, with porous cell walls partitioning the individual cells. Because one end of each of the cells is sealed by a sealant, the exhaust gas that is introduced into the honeycomb structure inevitably passes through the cell wall and is led outside the honeycomb structure. Accordingly, it is possible to capture the particulates or the like within the exhaust gas when the exhaust gas passes through the cell wall. Further, in the case where the honeycomb structure is used as the catalyst carrier, a catalyst carrier layer and the catalyst are provided on the surface of the cell wall in the longitudinal direction of the honeycomb structure. Hence, the toxic gas, such as Co, HC and NOx, included within the exhaust gas can be converted by the catalyst.

For example, the honeycomb structure described above is formed by bonding a plurality of pillar honeycomb units by interposing a bonding layer. This bonding layer greatly affects the characteristics of the completed honeycomb structure, such as the pressure intensity and the adhesion intensity. For this reason, various techniques have been proposed to provide honeycomb structures having desired, satisfactory characteristics, by controlling various characteristics of the bonding layer, such as the porosity and the composition of the bonding layer. For example, such techniques have been proposed in a Japanese Laid-Open Patent Application No. 2006-326831 and Published International Application WO03/067041, the contents of which are incorporated herein by reference in their entirety.

SUMMARY OF THE INVENTION

According to one aspect of the present invention, a method of producing a honeycomb structure includes a step of forming a ceramic block. The ceramic block is formed by bonding a plurality of honeycomb units that have a plurality of cells partitioned by cell walls by interposing a bonding layer, or by providing a ceramic block of a single honeycomb unit that has a plurality of cells partitioned by cell walls and providing a coating layer on an outer peripheral portion of the ceramic block. The bonding layer is provided as a paste of a bonding material including particles of a foaming material having a diameter in a range of approximately 1 µm to approximately 50 µm on each bonding surface of each honeycomb unit. The coating layer is provided as a paste of a coating material including particles of a foaming material having a diameter in a range of approximately 1 µm to approximately 50 µm on the outer peripheral portion of the ceramic block. The method further includes a step of blowing up the foaming material, and a step of evaporating the foaming material and forming bubble marks having a diameter in a range of approximately 100 µm to approximately 300 µm.

An average particle diameter of the particles of the foaming material is desirably in a range of approximately 5 µm to approximately 50 µm.

In addition, the paste of the bonding material desirably includes approximately 0.5 wt. % to approximately 10 wt. % of the particles of the foaming material.

The particles of the foaming material preferably expand to approximately 2 times to approximately 50 times by volume ratio, and more preferably expand to approximately 2 times to approximately 10 times by volume ratio.

The particles of the foaming material preferably have a size smaller than approximately 500 µm after the foaming.

The foaming material may include microcapsules.

The microcapsules may be formed by low-boiling-temperature hydrocarbon or carbon dioxide gas encapsulated by a resin.

The foaming material may include a foaming resin, an inorganic foaming material or an inflating agent.

The step of blowing up the foaming material is preferably carried out in a temperature range of approximately 80° C. to approximately 300° C.

The step of blowing up the foaming material may be carried out in a temperature range of approximately 90° C. to approximately 150° C.

The paste of the bonding material may further include an inorganic fiber and an inorganic binder.

The paste of the coating material may further include an inorganic fiber and/or inorganic particles, an inorganic binder and an organic binder.

The ceramic block may form a stacked structure made up of honeycomb units that are stacked by interposing spacers, and the method may include a step of filling up the paste of the bonding material into a space formed in the honeycomb units by the spacers.

Each of the plurality of cells may have two end portions, and the method may further include a step of sealing one of the two end portions of each of the plurality of cells.

The method may further include a step of providing a catalyst on each of the cell walls.

According to another aspect of the present invention, a honeycomb structure includes a ceramic block formed by bonding a plurality of honeycomb units that have a plurality of cells partitioned by cell walls using bonding layer or, a ceramic block formed by a single honeycomb unit that has a plurality of cells partitioned by cell walls, and a coating layer provided on an outer peripheral portion of the ceramic block. At least one of the bonding layer and the coating layer includes bubble marks having a diameter in a range of approximately 100 µm to approximately 300 µm.

The bonding layer and/or the coating layer preferably include/includes no bubble marks having a size exceeding approximately 300 μm.

Each of the plurality of cells may have two end portions, and one of the two end portions of each of the plurality of cells may be sealed.

A catalyst may be provided on each of the cell walls.

The honeycomb structure may be used as a diesel particulate filter that captures particulates within an exhaust gas.

The honeycomb structure may be used as a catalyst carrier that converts toxic gas components within an exhaust gas.

BRIEF DESCRIPTION OF THE DRAWINGS

Other objects and further features of the present invention will be apparent from the following detailed description when read in conjunction with the accompanying drawings, wherein:

FIGS. 10A, 10B and 10C are diagrams for explaining the generation of relatively large bubbles and the formation of macro pores within the bonding layer in a conventional process of drying the paste of the bonding layer;

FIG. 14 is a diagram showing a table of measured results obtained for examples and examples.

DESCRIPTION OF THE EMBODIMENTS

Figure 1:
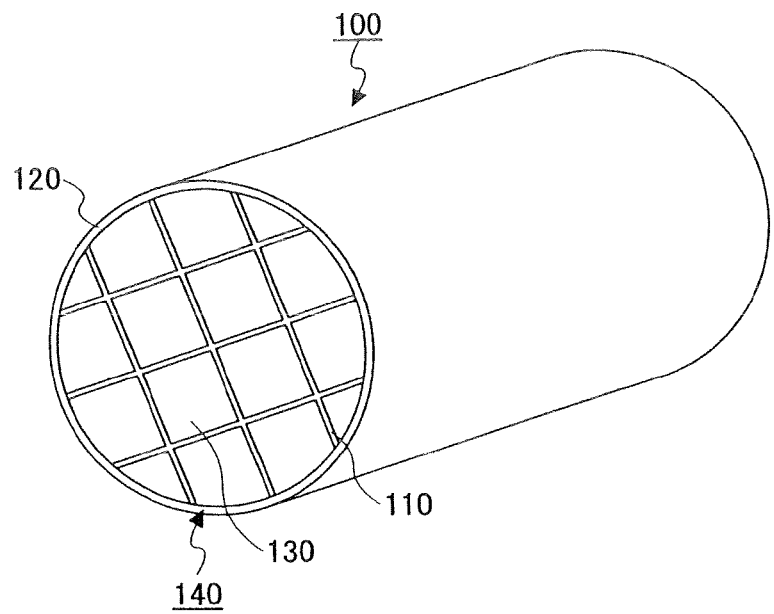
FIG. 1 is a perspective view schematically showing a honeycomb structure in an embodiment according to the present invention.

The embodiments will now be described with reference to the accompanying drawings, wherein like reference numerals designate corresponding or identical elements throughout the various drawings.

In one embodiment of the present invention, a method of producing a honeycomb structure includes a step of forming a ceramic block by bonding a plurality of honeycomb units that have a plurality of cells partitioned by cell walls using a bonding layer or, a step of forming a ceramic block by a single honeycomb unit that has a plurality of cells partitioned by cell walls, and a step of providing a coating layer on an outer peripheral portion of the ceramic block. In the method, the bonding layer is provided as a paste of a bonding material including particles of a foaming material having a diameter in a range of approximately 1 μm to approximately 50 μm on each bonding surface of each honeycomb unit. The coating layer is provided as a paste of a coating material including particles of a foaming material having a diameter in a range of approximately 1 μm to approximately 50 μm on the outer peripheral portion of the ceramic block. The method further includes a step of blowing up the foaming material; and a step of evaporating the foaming material and forming bubble marks having a diameter in a range of approximately 100 μm to approximately 300 μm.

In another embodiment of the present invention, a honeycomb structure includes a ceramic block formed by bonding a plurality of honeycomb units that have a plurality of cells partitioned by cell walls using bonding layer or, a ceramic block formed by a single honeycomb unit that has a plurality of cells partitioned by cell walls, and a coating layer provided on an outer peripheral portion of the ceramic block. At least one of the bonding layer and the coating layer includes bubble marks having a diameter in a range approximately 100 μm to approximately 300 μm.

According to the embodiments of the present invention, it is possible to avoid formation of macro pores in the bonding layer and/or the coating layer.

Conventionally, the bonding layer is formed by arranging the plurality of honeycomb units that are to be bonded to confront each other by interposing a spacer, for example, so that bonding (side) surfaces of the honeycomb units to be bonded confront each other. Then, a space formed by the spacer is filled by a paste which later becomes the bonding layer. The bonding layer is formed by drying and solidifying or firing the paste.

Normally, the honeycomb unit is made of porous ceramics, and moisture included within the paste will penetrate into the honeycomb unit during the drying process. For this reason, the volume of the paste that fills the space between the confronting honeycomb units will decrease with time. On the other hand, the volume of the space between the bonding surfaces of the confronting honeycomb units is determined by the honeycomb units or the spacer. Consequently, in the process of solidifying or firing the paste, relatively large bubbles are formed within the paste so as to compensate for the decrease in the paste volume caused by fugacity of the moisture. As a result, relatively large bubble marks (or macro pores) are formed within the completed bonding layer, and for example, a large number of macro pores having a diameter of approximately 1 mm or more are formed.

When such macro pores are formed within the bonding layer, the strength of the honeycomb structure easily deteriorates considerably. For example, if the honeycomb structure that is used has a large number of macro pores within the bonding layer, the macro pores easily join each other or, a crack is formed between the macro pores and the crack easily develops into a large crack, even in response to a relatively small stress, to thereby increase a propagation rate of the crack within the bonding layer. Accordingly, the honeycomb structure having the large number of macro pores within the bonding layer has a problem in that the honeycomb structure is easily damaged.

In addition, the honeycomb structure normally has a coating layer that is formed on an outer peripheral surface of the honeycomb structure excluding the end of each of the cells having a cell opening, for the purposes of adjusting the outer peripheral shape of the honeycomb structure. This coating layer is formed by applying a paste that includes moisture on the outer peripheral surface of the honeycomb structure. For this reason, problems similar to those described above that are encountered in the case of the bonding layer are also encountered in the case of this coating layer.

In one embodiment of the present invention, it is possible to realize a honeycomb structure which has a satisfactory strength by not including macro pores in a bonding layer and/or a coating layer, and a method of producing the honeycomb structure that can avoid formation of macro pores in the bonding layer and/or the coating layer.

A description will be given of various embodiments of the present invention, by referring to the drawings. In the following description, it is assumed for the sake of convenience that the honeycomb structure in an embodiment of the present invention is used as a Diesel Particulate Filter (DPF) that captures particulates within an exhaust gas. However, the honeycomb structure of the present invention may also be used as a catalyst carrier, as is evident to those skilled in the art.

Figure 2:
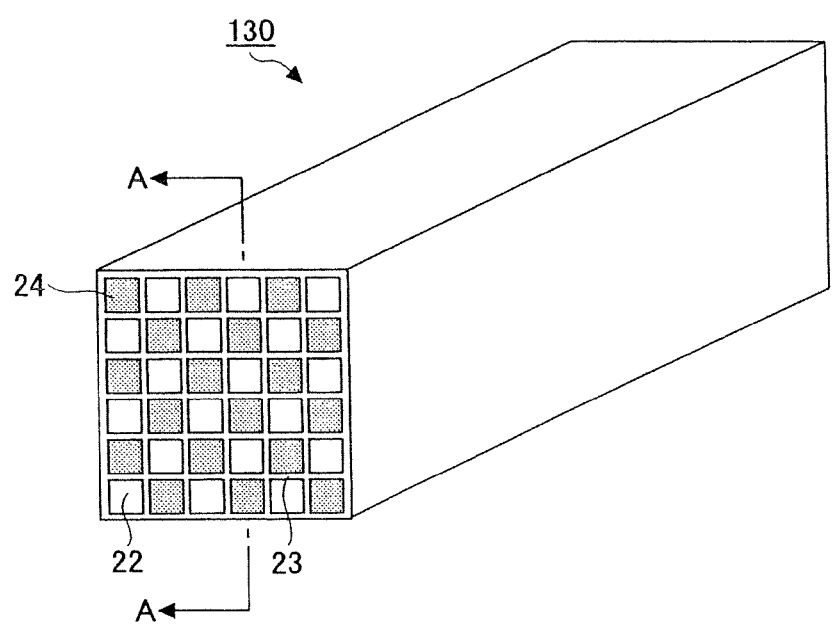
FIG. 2 is a perspective view schematically showing a honeycomb unit forming the honeycomb structure in the embodiment according to the present invention.
Figure 3:
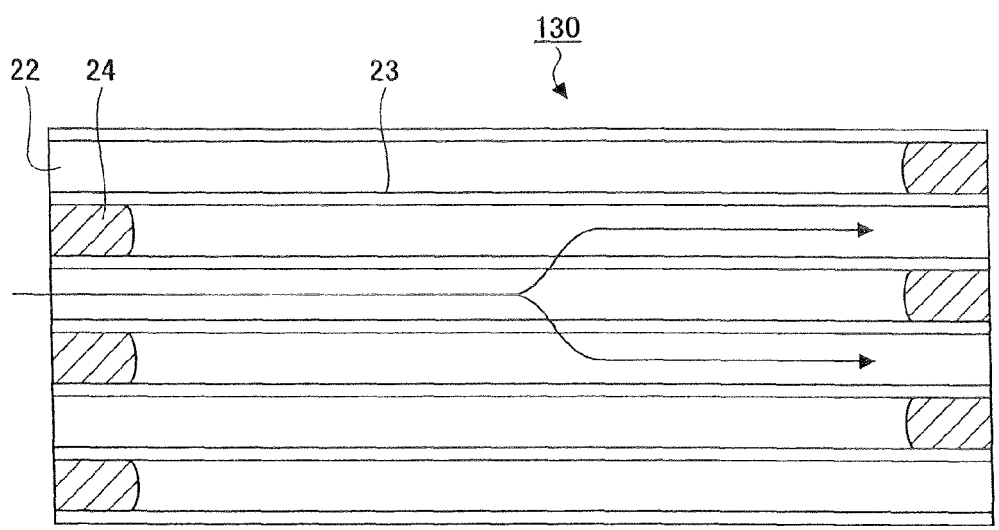
FIG. 3 is a cross sectional view of the honeycomb unit taken along a line A-A in FIG. 2.

FIG. 1 is a perspective view schematically showing a honeycomb structure in an embodiment according to the present invention. FIG. 2 is a perspective view schematically showing a honeycomb unit forming the honeycomb structure in the embodiment according to the present invention, and FIG. 3 is a cross sectional view of the honeycomb unit taken along a line A-A in FIG. 2.

As shown in FIG. 1, a honeycomb structure 100 has a ceramic block 140 and a coating layer 120. The ceramic block 140 has two end surfaces, and an outer peripheral portion connecting the two end surfaces. The coating layer 120 is formed on the outer peripheral portion of the ceramic block 140. Normally, the coating layer 120 is formed on the outer peripheral portion of the ceramic block 140 for the entire length of the ceramic block 140, for the purposes of adjusting the outer peripheral shape of the completed honeycomb structure 100 and functioning as a sealant.

For example, the ceramic block 140 is formed by bonding a plurality of pillar honeycomb units 130 shown in FIG. 2 that are made of ceramics, and thereafter cutting the outer periphery of the bonded honeycomb units 130 along a predetermined shape. This predetermined shape is a cylindrical shape in FIG. 1. Further, FIG. 1 shows a case where 4 honeycomb units 130 arranged in a horizontal direction and 4 honeycomb units 130 arranged in a vertical direction are bonded together to form the honeycomb structure 100 that is made up of 16 honeycomb units 130.

As shown in FIG. 2, the honeycomb unit 130 has a plurality of cells 22, and cell walls 23 partitioning each of the cells 22. The cells 22 extend from one end surface to the other end surface of the honeycomb structure 100 in a longitudinal direction of the honeycomb structure 100. In addition, one end surface of each cell 22 is sealed by a sealant 24, as shown in FIG. 3. Accordingly, the exhaust gas entering one cell 22 passes through one of the cell walls 23 partitioning this one cell 22, and is thereafter exhausted via another cell 22. The particulates included within the exhaust gas are captured by the cell walls 23 of the honeycomb unit 130 while the exhaust gas flows through the honeycomb unit 130, to thereby filter the exhaust gas.

The honeycomb structure 100 and the ceramic block 140 shown in FIG. 1 have the cylindrical shape. However, the honeycomb structure and the honeycomb block of the present invention are not limited to the cylindrical shape, and may have any pillar shape. Examples of such pillar shapes of the honeycomb structure and the honeycomb block are cylindroid shapes and rectangular pillar shapes.

In the honeycomb structure 100 in the embodiment of the present invention, the bonding layer 110 and/or the coating layer 120 include/includes "micro pores" but do/does not include "macro pores".

The "micro pores" refer to bubble marks having a maximum diameter of approximately 300 µm or less. On the other hand, the "macro pores" refer to bubble marks that are larger than the "micro pores". Normally, the "macro pores" generated in the bonding layer or the coating layer of the honeycomb structure has a diameter in a range of approximately 500 µm to approximately 2 mm. The "bubble marks" refer to residual spaces that finally remain at locations where bubbles existed within the ceramics (or ceramic paste material) before the drying process or during the drying process. Accordingly, it should be noted that the "bubble marks" are conceptually different from and are caused by a phenomenon different from the so-called bubbles or micro spaces generated by the mutual sintering of the ceramic particles.

In the following description, the embodiments of the present invention will be further described for the honeycomb structure 100 having the bonding layer 110 that includes no "macro pores". Of course, the honeycomb structure 100 may additionally have the coating layer 120 that includes no "macro pores", and it is obvious to those skilled in the art that effects similar to those obtainable by the bonding layer 110 including no "macro pores" are also obtainable by the honeycomb structure in embodiments in which the coating layer 120 including no "macro pores". The macro pores and the micro pores are also simply referred to as "pores". The macro pores and the micro pores include hollow spaces that are surrounded and have arbitrary shapes, and approximately spherical "pores", that include air or some other gas.

Figure 4:
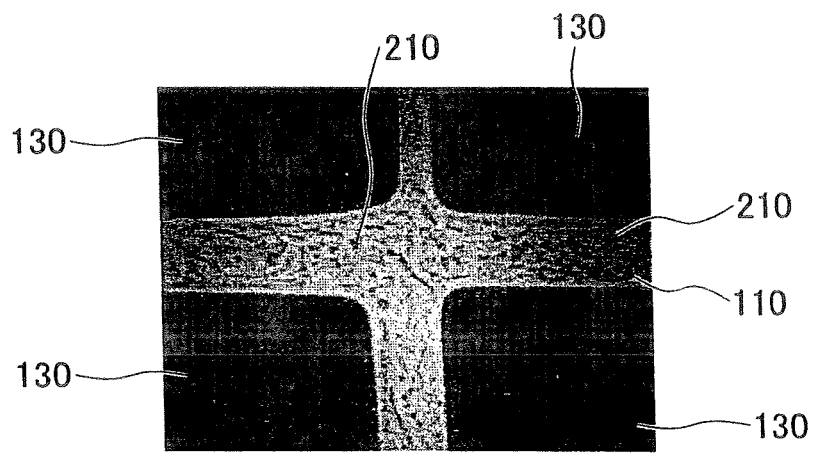
FIG. 4 is a diagram showing an enlarged photograph of a cross section cut perpendicularly to a longitudinal direction of the honeycomb structure shown in FIG. 2.
Figure 5:
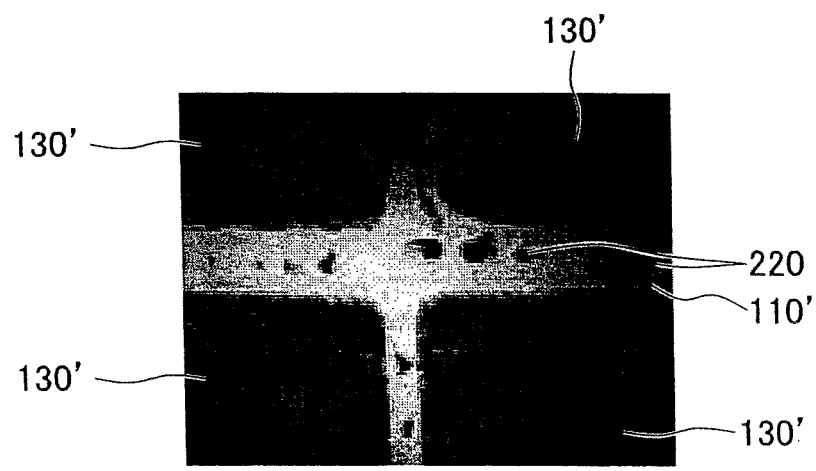
FIG. 5 is a diagram showing an enlarged photograph of a cross section cut perpendicularly to a longitudinal direction of a conventional honeycomb structure.

FIG. 4 is a diagram showing an enlarged photograph of a cross section cut perpendicularly to a longitudinal direction of the honeycomb structure 100 shown in FIG. 2. In addition, FIG. 5 is a diagram showing an enlarged photograph of a cross section cut perpendicularly to a longitudinal direction of a conventional honeycomb structure. FIGS. 4 and 5 show the photographs taken by a Scanning Electron Microscope (SEM) with a magnification of 25 times. FIG. 4 shows the bonding layer 110 and the honeycomb units 130 in the periphery of the bonding layer 110, and FIG. 5 shows a bonding layer 110' and honeycomb units 130' in the periphery of the bonding layer 110'. In FIGS. 4 and 5, the white portions correspond to the bonding layers 110 and 1101, the gray portions appearing in a lattice at the four corners correspond to cell walls of the honeycomb units 130 and 130', and the black portions correspond to the cells of the honeycomb units 130 and 130'. It was confirmed from FIG. 4 that in the honeycomb structure 100 according to the embodiment of the present invention, only micro pores 210 having a maximum diameter of approximately 200 µm are observed in the bonding layer 110, while it was confirmed from FIG. 5 that in the conventional honeycomb structure, a large number of macro pores 220 having a diameter in a range of approximately 500 µm to approximately 2 mm and particularly a large number of macro pores 220 having a diameter of approximately 1 mm are observed in the bonding layer 110'.

If the macro pores 220 shown in FIG. 5 are generated within the bonding layer 110', the macro pores 220 easily join each other and easily develop a large crack even in response to a relatively small stress, to thereby increase a propagation rate of the crack within the bonding layer 110'. As a result, the strength of the conventional honeycomb structure deteriorates considerably, and there is a problem in that the conventional honeycomb structure is easily damaged by the relatively small stress.

On the other hand, in the honeycomb structure 100 according to the embodiment of the present invention, the bonding layer 110 does not include the micro pores 220. For this reason, it is possible to avoid a situation where the macro pores 220 within the bonding layer 110 join each other and develop a crack when the honeycomb structure 100 is used, and thereby more easily prevent the honeycomb structure 100 from becoming damaged. Accordingly, it is possible in this case to improve the strength of the honeycomb structure 100.

Normally, the honeycomb unit 130 is made of a porous ceramic. Examples of the porous ceramic material include ceramic nitrides such as aluminum nitride, silicon nitride, boron nitride and titanium nitride, ceramic carbides such as silicon carbide, zirconium carbide, titanium carbide, tantalum carbide and tungsten carbide, and ceramic oxides such as alumina, zirconia, cordierite, mullite, silica and aluminum titanate, and the like. The honeycomb unit 130 may also be made of a composite material, such as a composite material of silicon and silicon carbide. When using the composite material of silicon and silicon carbide for the honeycomb unit 130, it is desirable to add 5 approximately weight percent (wt. %) to approximately 45 wt. % of silicon with respect to the total composite material.

When the porous ceramic is used for the large number of honeycomb units 130 forming the honeycomb structure 100, it is desirable to use a silicon carbide base ceramic that has a high heat resistance, superior mechanical characteristic and high thermal conductivity. The silicon carbide ceramic refers to a ceramic including approximately 60 wt. % of silicon carbide or more with respect to the total ceramic material. Of course, the honeycomb structure 100 may be made of a metal. In the case of the honeycomb structure 100 that is made up of a single honeycomb unit 130, it is desirable that the porous ceramic used for the honeycomb unit 130 is cordierite or aluminum titanate that have a high thermal shock resistance.

The average pore diameter of the honeycomb unit 130 is not limited to a particular value, but when capturing the particulates, the desirable lower limit is approximately 1 μm and the desirable upper limit is approximately 100 μm. If the average pore diameter is approximately 1 μm or more, the pressure loss is less likely to become large. On the other hand if the average pore diameter is approximately 100 μm or less, the particulates is less likely to pass through the pores, thereby making it possible to positively capture the particulates, and the capture efficiency is less likely to deteriorate.

The porosity of the honeycomb unit 130 is not limited to a particular value, but the desirable lower limit is approximately 20% and the desirable upper limit is approximately 80%. If the porosity is approximately 20% or more, the honeycomb structure 100 is less likely to easily clog when capturing the particulates. On the other hand, if the porosity is approximately 80% or less, the strength of the honeycomb structure 100 is less likely to deteriorate and the honeycomb structure 100 is less likely to break down easily. The porosity may be measured by known methods including the method of mercury penetration, the Archimedian method and the method using the SEM.

The open area ratio of the honeycomb unit 130 is not limited to a particular value, by the desirable lower limit is approximately 50% and the desirable upper limit is approximately 80%. If the open area ratio is approximately 50% or more, the pressure loss is less likely to become large. On the other hand, if the open area ratio is approximately 80% or less, the honeycomb structure 100 is less likely to deteriorate and the honeycomb structure 100 less likely to break down easily.

In addition, the desirable lower limit of the thickness of the cell wall of the honeycomb unit 130 is approximately 0.1 mm, and the desirable upper limit is approximately 0.5 mm. A more desirable upper limit of the thickness of the cell wall of the honeycomb unit 130 is approximately 0.35 mm. If the thickness of the cell wall is approximately 0.1 mm or more, the strength of the honeycomb structure 100 will not become too small. On the other hand, if the thickness of the cell wall is approximately 0.5 mm or less, the pressure loss will not become too large, and the thermal capacity of the honeycomb structure 100 will not become too large, thereby making it easier to purify (burning of particulate matter) the exhaust gas immediately after the engine is started when the honeycomb structure 100 is provided with a catalyst that decreases the burning temperature of the particular matter.

The sealant 24 and the cell wall 23 of the honeycomb unit 130 are desirably made of the same porous ceramic. In this case, it is possible to more easily bond the sealant 24 and the cell wall 23 with a high bonding strength. In addition, by adjusting the porosity of the sealant 24 to become the same as that of the cell wall 23, it is possible to match the coefficients of thermal expansion of the cell wall 23 and the sealant 24. As a result, it is possible to more easily prevent a gap from being formed between the sealant 24 and the cell wall 23 due to thermal stress at the time of producing or using the honeycomb unit 130, and to more easily prevent a crack from being generated in the sealant 24 or in the cell wall 23 at the portion making contact with the sealant 24.

The thickness of the sealant 24 is not limited to a particular value, but when the sealant 24 is made of a porous silicon carbide, the desirable lower limit of the thickness is approximately 1 mm and the desirable upper limit of the thickness is approximately 20 mm. A more desirable lower limit and a more desirable upper limit of the thickness of the sealant 24 are approximately 3 mm and approximately 10 mm, respectively.

Materials and the like of the bonding layer 110 and the coating layer 120 will be described later in the specification.

In the honeycomb structure 100 in the embodiment of the present invention, instead of or, in addition to sealing the end portions of the cells of the honeycomb units 130 by the sealant 24, it is possible to make at least a portion of the cell wall 23 carry the catalyst. In this case, the honeycomb structure 100 can be used as a catalyst carrier that converts toxic gas components within the exhaust gas, such as CO, HC and NOx, by the catalytic reaction.

The catalyst carried by the cell wall 23 is not limited to a particular catalyst, and for example, noble metals such as platinum, palladium and rhodium may be used as the catalyst. In addition, the catalyst may be a compound that includes, in addition to such a noble metal, an alkaline metal element (first group of the periodic system), alkaline earth metal element (second group of the periodic system), a rare earth element (fourth group of the periodic system) and a transition metal element.

When the cell wall 23 of the honeycomb unit 130 carries the catalyst, the surface of the cell wall 23 that carries the catalyst may be precoated with a catalyst carrier layer made of alumina or the like. The catalyst carrier layer may be made of a ceramic oxide such as alumina, titania, zirconia and silica.

The honeycomb structure that is formed by the honeycomb units 130 carrying the catalyst functions as an exhaust gas treating apparatus which is similar to the known, conventional catalyst carrying type DPF (catalyst type DPF). Accordingly, a detailed description of the case where the honeycomb structure 100 in the embodiment of the present invention also functions as the catalyst carrier will be omitted in this specification.

Figure 6:
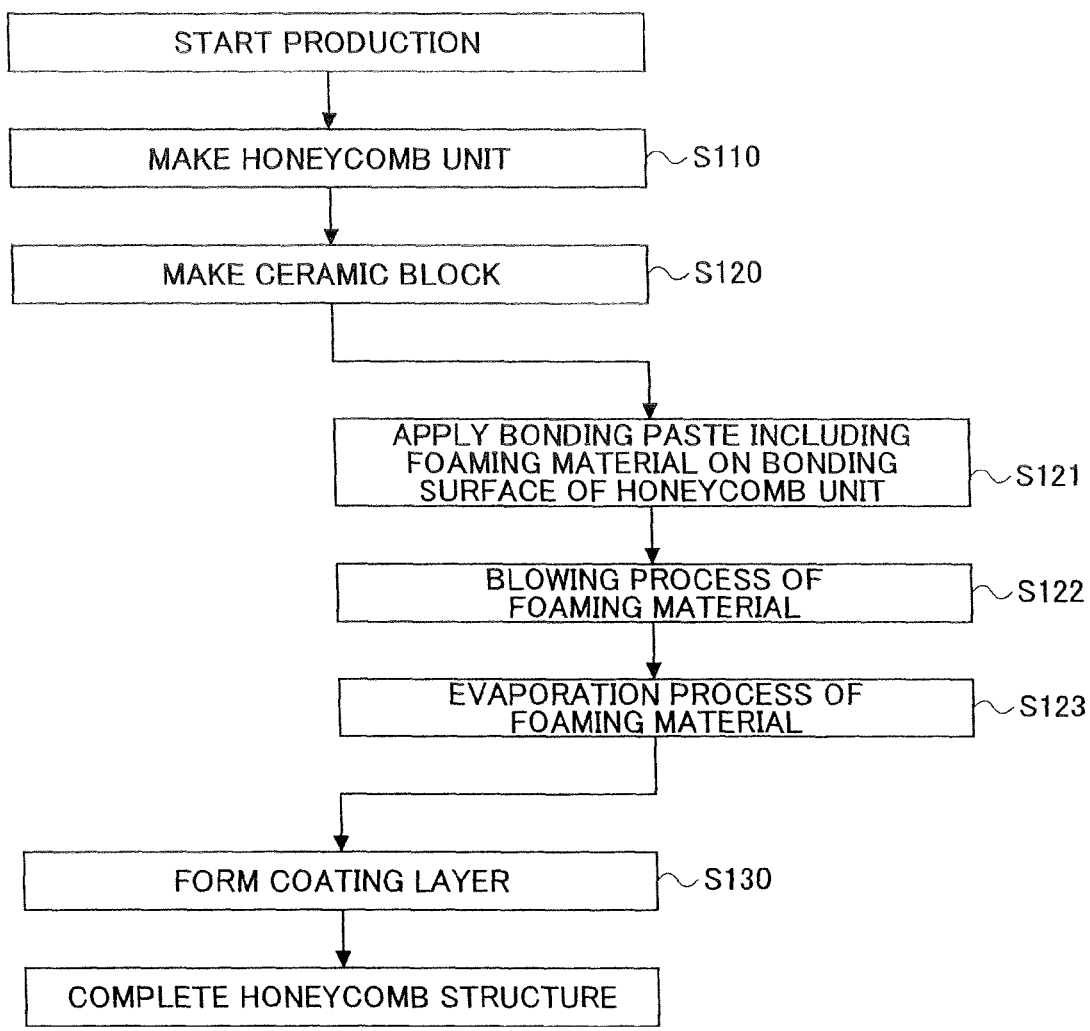
FIG. 6 is a flow chart for explaining a method of producing honeycomb structure in the embodiment according to the present invention.

Next, a description will be given of the method of producing the honeycomb structure in the embodiment according the present invention. FIG. 6 is a flow chart for explaining the method of producing honeycomb structure according to the embodiment of the present invention. The method of producing the honeycomb structure of the embodiment of the present invention shown in FIG. 6 produces the honeycomb structure by carrying out a honeycomb unit producing process in a step S110, a ceramic block producing process in a step S120, and a coating layer forming process in a step S130. In the method of producing the honeycomb structure according to the embodiment of the present invention, the ceramic block producing process of the step S120 includes steps S121, S122 and S123. The step S121 carries out a process of applying on the bonding surface of the honeycomb unit a paste of the bonding layer including a foaming material (or a blowing material). The step S122 carries out a blowing process (or a foaming process) on the foaming material, and the step S123 carries out a process of evaporating or removing the foaming material.

A more detailed description will now be given of each of the processes shown in FIG. 6.

Step S110: Honeycomb Unit Producing Process

In the step S110, an extrusion molding is carried out using a raw material paste that has a powder of the ceramic described above, a binder and a dispersing solvent as the main components, so as to make a molded body having a rectangular pillar shape or the like that later becomes the honeycomb unit.

The raw material paste is not limited to a particular material, but the porosity of the produced honeycomb unit is desirably in a range of approximately 20% to approximately 80%. For example, the raw material paste includes the binder, the dispersing solvent and the like that are added to the ceramic powder.

The particle diameter of the ceramic powder is not limited to a particular value, but it is desirable that the contraction of the particle diameter is small when the firing process is carried out afterwards. For example, the ceramic powder is desirably a combination of 100 parts by weight (pts. wt.) of ceramic powder having an average particle diameter in a range of approximately 0.3 μm to approximately 70 μm, and approximately 5 pts. wt. to approximately 65 pts. wt. of ceramic powder having an average particle diameter in a range of approximately 0.1 μm to approximately 1.0 μm. The pore diameter and the like of the honeycomb unit may be adjusted by adjusting the firing temperature and the particle diameter of the ceramic powder.

The binder that is added to the raw material paste is not limited to a particular material. For example, methylcellulose, carboxylmethylcellulose, hydroxylethylcellulose, polyethyleneglycol and the like may be used for the binder. Normally, the amount of binder that is mixed to the ceramic powder is desirably in a range of approximately 1 pts. wt to approximately 15 pts. wt. with respect to 100 pts. wt. of the ceramic powder.

The dispersing solvent that is added to the raw material paste is not limited to a particular material. For example, organic solvents such as benzene, alcohols such as methanol, water and the like may be used for the dispersing solvent. A suitable amount of the dispersing solvent is mixed to the ceramic powder so that the viscosity of the material paste falls within a predetermined range.

If necessary, a molding assistant may be added to the raw material paste. The molding assistant is not limited to a particular material. For example, ethyleneglycol, dextrin, fatty acid, fatty acid soap, polyvinylalcohol and the like may be used for the molding assistant. Furthermore, it is possible to add to the raw material paste, if necessary, a pore generating agent such as balloons that are micro-hollow spheres having ceramic oxide as their component, globular acrylic particles, graphite and the like. The balloons are not limited to a particular material, and may be selected from a group consisting of alumina balloons, glass micro-balloons, Shirasu-balloons, Fly Ash (FA) balloons and mullite balloons, for example. Of this group, the alumina balloons are desirably used for the balloons that are added to the material paste.

The ceramic power, the binder, the dispersing solvent, the molding assistant and the pore generating agent are mixed by an attriter or the like, and after being sufficiently kneaded by a kneader, used to form the molded body by the extrusion molding.

The molded body that is obtained by the extrusion molding is subjected to a drying process using a microwave drier, a hot air drier, an oven, dielectric drier, a decompression drier, a vacuum drier, a freeze drier or the like. Next, when producing the honeycomb structure for use as the DPF, a predetermined amount of seal paste which later becomes the sealant is applied on one end of each cell of the molded body.

The seal paste is not limited to a particular material, but the seal paste is desirably made of a material that results in a porosity in a range of approximately 30% to approximately 75% after the sealant is obtained by a process that is carried out afterwards. For example, the paste of the sealant material may have a composition similar to that of the raw material paste of the honeycomb unit described above.

Next, with respect to the molded body that is applied with the seal paste, a degreasing is carried out under a predetermined condition (for example, under a temperature of approximately 200° C. to approximately 500° C.) and a firing is carried out under a predetermined condition (for example, under a temperature of approximately 1400° C. to approximately 2300° C.), so as to produce the honeycomb unit. The conditions of the degreasing and firing processes may be set similarly to those used by the conventional process of producing a filter made of the porous ceramic.

Step S120: Ceramic Block Producing Process

Next, the ceramic block is produced in the following manner. First, when producing the ceramic block from the honeycomb units that are produced in the above described manner, 4 honeycomb units are arranged in a horizontal direction by interposing spacers and 4 honeycomb units are arranged in a vertical direction by interposing spacers, for example, and the honeycomb units are then bonded together to form a stacked structure that is made up of 16 honeycomb units. The spaces in the stacked structure of the honeycomb units, that are formed by the spacers, are filled by the paste of the bonding layer. Further, this paste of the bonding layer is dried and solidified, so as to form a ceramic block having each of the honeycomb units bonded together by interposing the bonding layer.

Figure 7:
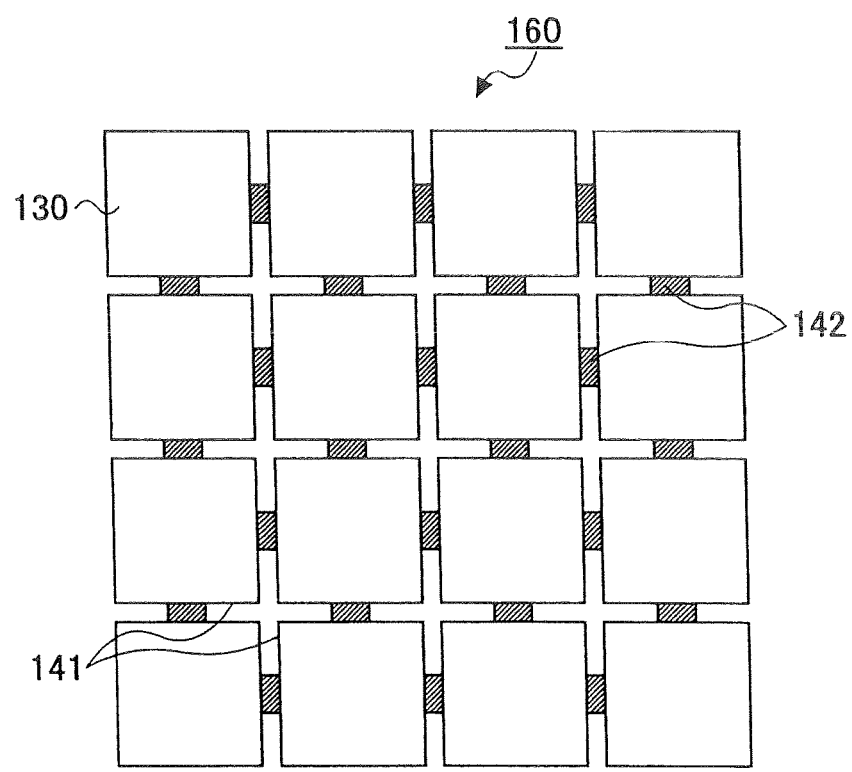
FIG. 7 is a diagram schematically showing a cross section cut perpendicularly to a longitudinal direction of a stacked structure made up of honeycomb units prior to forming a bonding layer.
Figure 8:
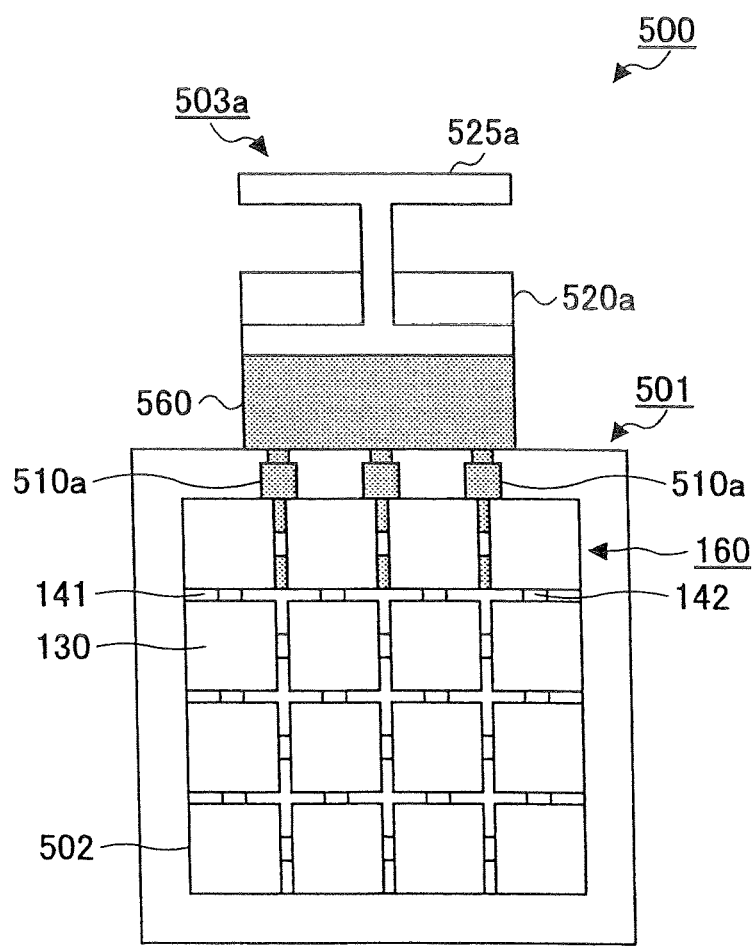
FIG. 8 is a diagram schematically showing a cross section cut perpendicularly to a longitudinal direction of a filler dispenser that fills a paste of the bonding layer into a space of the stacked structure made up of the honeycomb units.
Figure 9:
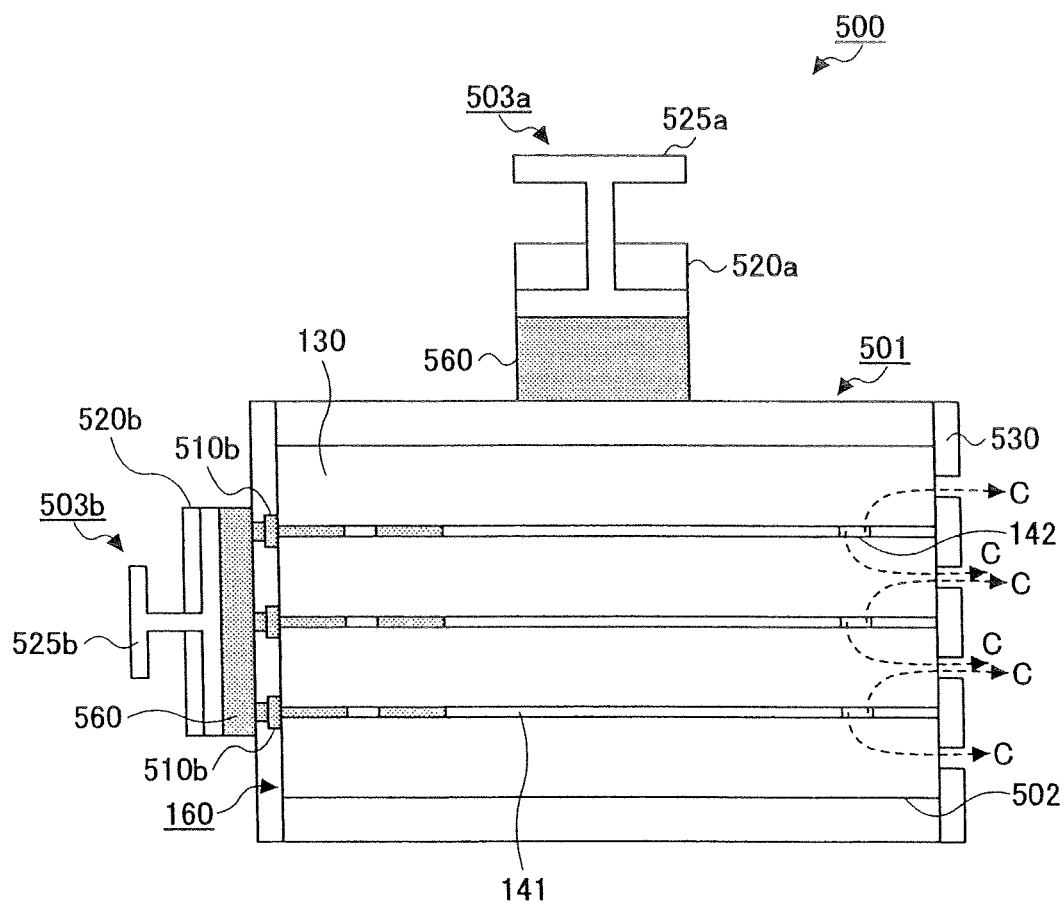
FIG. 9 is a diagram schematically showing a cross section cut parallel to the longitudinal direction of the filler dispenser that fills up the paste of the bonding layer into the space of the stacked structure made up of the honeycomb units.

A more detailed description will now be given of the ceramic block producing process, by referring to FIGS. 7 through 9. FIG. 7 is a diagram schematically showing a cross section cut perpendicularly to a longitudinal direction of the stacked structure made up of honeycomb units prior to forming the bonding layer, and FIGS. 8 and 9 are diagrams showing a filler dispenser that applies the paste of the bonding layer. More particularly, FIG. 8 is a diagram schematically showing a cross section cut perpendicularly to a longitudinal direction of the filler dispenser that fills the paste of the bonding layer into the spaces of the stacked structure made up of the honeycomb units, and FIG. 9 is a diagram schematically showing a cross section cut parallel to the longitudinal direction of the filler dispenser that fills the paste of the bonding layer into the spaces of the stacked structure made up of the honeycomb units.

As shown FIG. 7, 4 honeycomb units 130 are arranged in the horizontal direction by interposing the spacers 142 and 4 honeycomb units 130 are arranged in the vertical direction by interposing the spacers 142, for example. Hence, a space 141, that corresponds to the thickness of the spacer 142, is formed between two mutually confronting honeycomb units 130.

The spacer 142 is not limited to a particular shape, and may have an arbitrary shape including a cylindrical shape and a rectangular pillar shape.

The position where the spacer 142 is located is not limited to a particular position, but the spacer 142 is desirably located in a vicinity of the four corners of the side surface of the honeycomb unit 130.

The material of the spacer 142 is not limited to a particular material. For example, paper, inorganic materials, ceramics, organic fibers, resins and the like may be used for the spacer 142. Particular examples of the material used for the spacer 142 include cardboard, graphite, silicon carbide and the like. A material that is identical to that used for the bonding layer may be used for the spacer 142, by adjusting the thickness of this material and solidifying this material in advance.

Next, the paste of the bonding layer is filled into the space 141 between the honeycomb units 130 that are separated by the spacers 142.

A filler dispenser 500 shown in FIGS. 8 and 9 is used to apply the paste of the bonding layer so as to fill the space 141.

The filler dispenser 500 has a tubular body 501, a first paste supplying unit 503a and a second paste supplying unit 503b. The tubular body 501 has an internal space 502 that is capable of accommodating a stacked structure of the honeycomb units 130 described above. In other words, the tubular body 501 has four side surfaces and two end surfaces defining the internal space 502. A bottom plate 530 which can open and close is provided on one of the two end surfaces not mounted with the second paste supplying unit 503.

The first paste supplying unit 503a is mounted on one of the four side surfaces of the tubular body 501, and the second paste supplying unit 503b is mounted on one of the two end surfaces of the tubular body 501. The first paste supplying unit 503a has a paste chamber 520a for accommodating a paste 560, and an extruding mechanism 525a for extruding the paste 560 that is accommodated within the paste chamber 520a outside the paste chamber 502a. The second paste supplying unit 503b has a paste chamber 520b for accommodating the paste 560, and an extruding mechanism 525b for extruding the paste 560 that is accommodated within the paste chamber 520b outside the paste chamber 502b. Openings are provided at a bottom portion of each of the first and second paste supplying units 503a and 503b.

Openings 510a are provided on the side surface of the tubular body 501 that is mounted with the first paste supplying unit 503a, and openings 510b are provided on the end surface of the tubular body 501 that is mounted with the second paste supplying unit 503b. In a state where the first and second paste supplying units 503a and 503b are mounted on the tubular body 501, the paste chambers 520a and 520b communicate with the internal space 502. The dimensions and the intervals at which the openings 510a and 510b of the tubular body 501 are provided are set so that the openings 510a and 510b correspond to the positions of each of spaces 141 in the stacked structure 160 of the honeycomb units 130 accommodated within the internal space 502.

The paste of the bonding layer is filed into the spaces 141 of the stacked structure 160 of the honeycomb units 130 by use of the filler dispenser 500 described above.

After the stacked structure 160 of the honeycomb units 130 is assembled using the spacers 142, this stacked structure 160 is accommodated within the internal space 502 of the tubular body 501. Then, the first and second paste supplying units 503a and 503b are mounted on one side surface and one end surface of the tubular body 501, respectively, and the respective paste chambers 520a and 520b are filled with the paste of the bonding layer. Next, the when the paste 560 is extruded from the paste chambers 520a and 520b of the paste supplying units 503a and 503b using the extruding mechanisms 525a and 525b, the paste 560 from the first and second paste supplying units 503a and 503b is supplied to the internal space 502 via the openings 510a and 510b in the tubular body 501. As described above, the openings 510a and 510b in the tubular body 501 correspond to the positions of the spaces in the stacked structure 160 of the honeycomb units 130, and thus, the paste 560 can be injected appropriately into each of the spaces 141.

As a result, it is possible to obtain the stacked structure 160 of the honeycomb units 130 in which the spaces 141 are filled with the paste of the bonding layer.

Normally, the honeycomb units 130 are made of a porous ceramic, and for this reason, the moisture included in the paste of the bonding layer will begin to penetrate into the honeycomb units 130 from the surface of the honeycomb units 130 making contact with the paste, immediately after the paste of the bonding layer fills the spaces 141 in the stacked structure 160 of the honeycomb units 130. Hence, the volume of the paste filling the spaces 141 in the stacked structure 160 of the honeycomb units 130 will decrease with time. But on the other hand, the spatial volumes of the spaces 141 formed between the bonding surfaces of the adjacent honeycomb units 130 are defined by the spacers 142. For this reason, it may be regarded that a large number of macro pores having a diameter of approximately 1 mm will be formed within the completed bonding layer so as to compensate for the decrease in the paste volume caused by fugacity of the moisture, as described above in conjunction with FIG. 5. When such macro pores are formed within the bonding layer, the strength of the bonding layer and the honeycomb units 130 will easily deteriorate considerably.

But in the embodiment of the present invention, the particles of the "foaming material" are added to the paste of the bonding material as described above in conjunction with the step S121 shown in FIG. 6, so as to avoid the generation of the macro pores and to thereby prevent the problems caused thereby. The "foaming material" is a material having an expansion characteristic and an evaporation characteristic that have a temperature dependency, and refers to a material that has not yet reached an expanded state. Accordingly, a "foamed material" which has already expanded and does not have a further expansion characteristic is not included in the "foaming material" used in the embodiment of the present invention.

In a case where the paste of the bonding layer includes the particles of such a foaming material, it is possible to obtain the following effects. That is, if the stacked structure 160 of the honeycomb units 130 is maintained at a temperature range in which the expansion and evaporation characteristics of the foaming material occur in the drying process of the paste of the bonding layer, the apparent volume of the paste of the bonding material increases due to the expansion effect of the foaming material that is included in the paste of the bonding layer, thereby making it possible to compensate for the decrease in the volume of the paste caused by the moisture penetration into the honeycomb units 130. In addition, after the foaming material particles are evaporated, the micro pores are formed as the bubble marks at the locations where the foaming material particles existed, and it may thus be regarded possible to avoid the macro pores from being formed within the completed bonding layer.

Figure 11A:
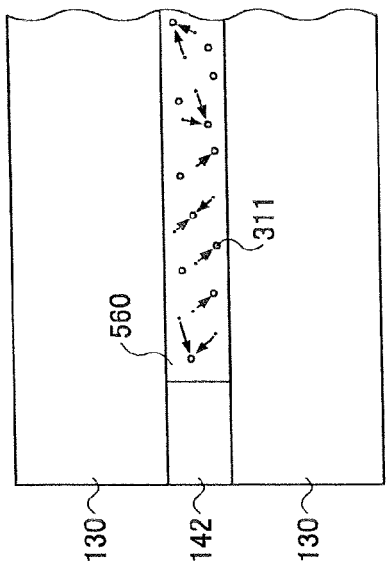
FIGS. 11A, 11B and 11C are diagrams for explaining the generation of relatively small bubbles and the formation of micro pores within the bonding layer in a process of drying the paste of the bonding layer in the embodiment of the present invention.
Figure 11B:
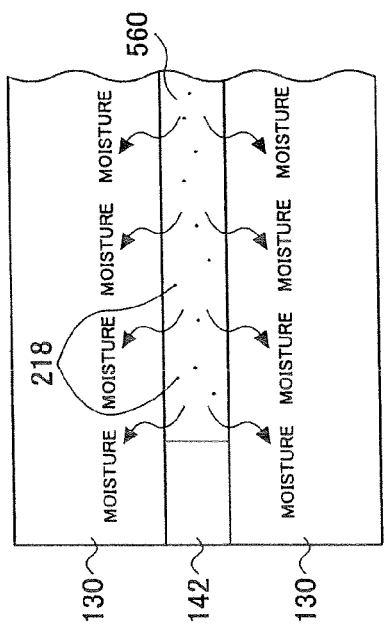
Figure 11C:
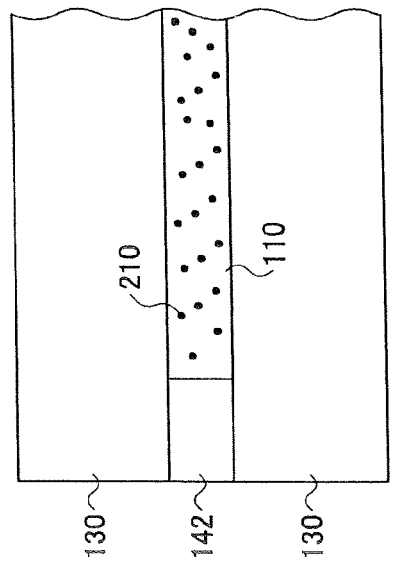

A more detailed description will now be given of such effects of the embodiment of the present invention, by referring to FIGS. 10A through 10C and FIGS. 11A through 11C which show the formation of the bonding layer by the drying and solidifying of the paste of the bonding layer during the drying process of the paste of the bonding layer. FIGS. 10A, 10B and 10C are diagrams for explaining the generation of relatively large bubbles and the formation of macro pores within the bonding layer in the conventional process of drying the paste of the bonding layer. FIGS. 11A, 11B and 11C are diagrams for explaining the generation of relatively small bubbles and the formation of micro pores within the bonding layer in a process of drying the paste of the bonding layer in the embodiment of the present invention. It may be regarded that the macro pores and the micro pores are generated in the following manner.

As described above, when the drying process of the conventional method is carried out, the moisture included in a paste 560' shown in FIG. 10A penetrates into the pores within the honeycomb units 130 from the surface of the honeycomb units 130 making contact with the paste 560'. Hence, the amount of the paste 560' decreases and the volume of the paste 560' becomes smaller than the volume of the space 141 formed by the spacer 142. For this reason, in an initial stage of the drying process, a large number of micro bubbles 218 are formed within the paste 560'. It is the nature of such micro bubbles 218 to join each other and form larger bubbles. Particularly in the drying process of the paste 560', the micro bubbles 218 have a high mobility, thereby making it easier for the micro bubbles 218 to join each other. Accordingly, due to this behavior of the micro bubbles 218 that easily join each other, large bubbles 219 shown in FIG. 10B corresponding to the lack of paste volume are formed within the paste 560'. In addition, after the drying and solidifying process of the paste 560' is completed, it may be regarded that macro pores 220 are generated as bubble marks at the locations where the large bubbles 219 existed, as shown in FIG. 10C.

On the other hand, in the drying process of a paste 560 in the embodiment of the present invention, the volume of the paste 560 decreases because the moisture included in the paste 560 penetrates into the honeycomb units 130 as shown in FIG. 11A, similarly as in the case of the conventional method. However, in the embodiment of the present invention, the paste 560 includes foaming material particles 311 shown in FIG. 11B, and the foaming material particles 311 expand during the drying process. For example, the foaming material particles 311 expand to approximately 2 times to approximately 50 times by volume ratio, and more preferably to approximately 2 times to approximately 10 times by volume ratio. By such a volume expansion of the foaming material particles 311, the flowability of the paste 560 of the bonding layer improves. The improved flowability of the paste 560 of the bonding layer interferes with the joining of the micro bubbles, thereby making it difficult for large buckles to be formed within the paste 560. The foaming material particles 311 merely push the paste 560 of the bonding layer because the paste 560 is located in the periphery of the foaming material particles 311, and it may be regarded that the bubbles formed by the foaming material do not become macro pores but become micro pores. Hence, in this case, micro bubbles 218 remain within the paste 560 without joining during the drying process. It may be regarded that a portion of the micro bubbles 218 are released to the outside from the paste 560. Therefore, it may be regarded that the micro pores 210 are finally formed in the paste 560 as shown in FIG. 11C by the large number of bubble marks of the foaming material particles 311 after the expansion (and bubble marks caused by the micro bubbles 218).

Large bubbles may be introduced within the paste 560 of the bonding material when applying the paste 560 of the bonding material on the surface of the honeycomb unit 130. However, due to the flowability of the paste 560 caused the volume expansion of the foaming material, it may be regarded that the large bubbles are fragmented by the smaller bubbles and are evaporated thereby.

In the description given heretofore, a mechanism is described in which the moisture included in the paste of the bonding layer penetrates into the honeycomb unit 130, to thereby generate the bubble marks within the bonding layer. However, in a case where an organic binder is included within the paste of the bonding layer, it should be noted that this organic binder evaporates during the drying process and may generate bubble marks within the bonding layer by a mechanism similar to that described above.

In order to generate the effects according to the embodiment of the present invention described above when carrying out a process similar to the conventional drying process, it is desirable that the foaming material particles have a characteristic such that the foaming material particles expand and become evaporated in a temperature range of the conventional drying process, that is, in a temperature range of approximately 80° C. to approximately 300° C. It is particularly desirable for the foaming material particles to generate such a characteristic in a temperature range of approximately 90° C. to approximately 150° C. In addition, it is desirable that the foaming material particle used in the embodiment of the present invention has a size less than approximately 500 µm after the foaming. Otherwise, even if the foaming material is added to the paste of the bonding layer, large bubble marks will be generated by the expansion of the foaming material itself, and macro pores may be finally formed within the bonding layer. Moreover, the coefficient of expansion of the foaming material is desirably approximately 2 times to approximately 10 times from the point of view of the availability and size stability (that is, small inconsistency) after the expansion. Accordingly, the upper limit of the diameter of the foaming material particles usable in the embodiment of the present invention is desirably 50 µm. If the upper limit of the diameter of the foaming material particles is approximately 50 µm, the particle size after the expansion falls in a range of approximately 100 µm to approximately 500 µm, and macro pores are less likely to be formed even if the particles having such a size remain as bubble marks. Even if some particles should remain as bubble marks and form macro pores, it may be regarded that the number of such particles would be extremely small such that a crack in the bonding layer would be virtually unaffected thereby. On the other hand, although the lower limit of the diameter of the foaming material particles usable in the present invention is not limited to a particular value, it is desirable from the point of availability that the diameter is approximately 1 μm or more. But if necessary, it is of course possible to use a foaming material having a particle diameter less than 1 μm. The diameter of the foaming material particle may be measured from photographs taken by a wavelength microscope or an SEM.

The foaming material can be categorized into two kinds of materials, one that expands in response to heat, and the other that generates gas in response to a chemical reaction.

The kind of foaming material that expands in response to the heat includes microcapsules, foaming resins and the like. The kind of foaming material that generates gas in response to the chemical reaction includes inorganic foaming materials, inflating agents and the like.

The "microcapsules" are thermal expansion particles that are obtained by encapsulating a low-boiling-point material (for example, hydrocarbon of butane, pentane or the like) or a gas (for example, carbon dioxide gas or the like) by a capsule (or shell) made of a copolymer material, such as vinylidene chloride, acrylonitrile, melanin and phenol, by the in-site polymerization or the like.

On the other hand, acrylonitrile, polypropylene, polystyrene, polyethylene-terephthalate, polycarbonate and the like, for example, may be used for the foaming resin.

In addition, perlite resin, Shirasu-balloons and the like, for example, may be used for the inorganic foaming material.

Ammonium chloride, ammonium hydrogencarbonate, sodium hydrogencarbonate, amyl acetate, butyl acetate, aluminum ammonium sulfate, aluminum potassium sulfate, potassium hydrogen tartrate, diazoaminobennzene and the like, for example, may be used for the inflating agent.

Preferably, approximately 0.5 wt. % to approximately 10 wt. % of the foaming material described above is added with respect to the total wt. % of the paste of the bonding layer. This is because the effects of the foaming material are more easily and sufficiently exhibited and the macro pores are less likely to be generated if the added amount of the foaming material is approximately 0.5 wt. % or more, and the number of micro pores is less likely to increase and the bonding strength is less likely to deteriorate if the added amount of the foaming material is approximately 10 wt. % or less. The foaming material (for example, the inflating agent described above) that uses the chemical reaction begins to solidify when added to the paste, and may not function as a foaming material. On the other hand, in the case of the inorganic foaming material, the mineral may remain within the void even when fired. For this reason, the microcapsules and the foaming resins are desirably used as the foaming material. In the case of the microcapsules and the foaming resins, it is possible to evaporate the resin component by drying or firing or burning.

Normally, the paste of the bonding layer further includes an inorganic fiber and an inorganic binder. For example, the inorganic fiber includes ceramic fibers and whiskers such as silica-alumina, mullite, alumina, silica and aluminum boric acid whisker. The inorganic fiber may be made up of one or a combination of two or more kinds of such ceramic fibers and whiskers. Among the inorganic fiber materials, the silica-alumina fiber is desirably included in the paste of the bonding layer.

The lower limit of the aspect ratio of the inorganic fiber is desirably approximately 3, because the contact between the inorganic fiber and the inorganic binder increases and the bonding strength improves as a result if the aspect ratio of the inorganic fiber is approximately 3 or more. On the other hand, the upper limit of the aspect ratio of the inorganic fiber is desirably approximately 50, because a gap is less likely generated between the inorganic fibers in the formed bonding layer and a sufficiently large bonding strength is more easily generated as a result if the aspect ratio of the inorganic fiber is approximately 50 or less. The aspect ratio of the inorganic fiber is calculated by dividing the average fiber length of the inorganic fiber by the average fiber diameter of the inorganic fiber. The desirable lower limit of the average fiber diameter of the inorganic fiber is approximately 55 μm, and more desirably approximately 60 μm. The desirable upper limit of the average fiber diameter of the inorganic fiber is approximately 200 μm, and more desirably approximately 100 μm. In addition, the desirable lower limit of the average fiber length of the inorganic fiber is approximately 18 μm, and more desirably approximately 20 μm. The desirable upper limit of the average fiber length of the inorganic fiber is approximately 5000 μm, and more desirably approximately 2000 μm.

The inorganic fiber content included in the paste of the bonding layer is desirably approximately 30 wt. % or more, and more desirably approximately 35 wt. % or more. In addition, the inorganic fiber content included in the paste of the bonding layer is desirably approximately 50 wt. % or less, and more desirably approximately 45 wt. % or less.

For example, silica sol, alumina sol and the like is used for the inorganic binder included in the paste of the bonding layer. Of the materials usable as the inorganic binder, one kind of material may be used as the inorganic binder or, a combination of two or more kinds of materials may be used as the inorganic binder. Among the inorganic binder materials, the silica sol is desirably included in the paste of the bonding layer. The inorganic binder content included in the paste of the bonding layer is desirably approximately 10 at. % or more, and more desirably approximately 15 wt. % or more. In addition, the upper limit of the inorganic binder content included in the paste of the bonding layer is desirably approximately 30 wt. % or less, and more desirably approximately 25 wt. % or less.

Furthermore, the paste of the bonding layer may additionally include inorganic particles. For example, carbides, nitrides and the like may be used for the inorganic particles. More particularly, inorganic powders or the like of silicon carbide, silicon nitride, boron nitride and the like may be used as the inorganic particles. The inorganic particles may be made up of one or a combination of two or more kinds of such inorganic powders. Among the inorganic particle materials, the silicon carbide having a good thermal conductivity is desirably included in the paste of the bonding layer.

In addition, the paste of the bonding layer may further include an organic binder. By mixing the organic binder to the paste of the bonding layer and adjusting the viscosity of the paste, it is possible to improve the adhesion of the paste of the bonding layer and to improve the bonding characteristic of the bonding layer. The organic binder content included in the paste of the bonding layer is desirably approximately 1.5 wt. % or less, and more desirably approximately 1.0 wt. % or less. The viscosity of the paste of the bonding layer is desirably in a range of approximately 20 Pa·s to approximately 60 Pa·s.

For example, polyvinylalcohol, methylcellulose, ethylcellulose, carboxylmethyl-cellulose and the like may be used for the organic binder. The organic binder may be made up of one or a combination of two or more kinds of such organic binder materials. Among the organic binder materials, the carboxylmethylcellulose is desirably included in the paste of the bonding layer. Of course, the paste of the bonding layer may not include the inorganic fiber, and include the inorganic particles and the inorganic binder, and further include the organic binder if necessary.

After forming the stacked structure 160 of the honeycomb units 130 having the spaces 141 filled by the paste 560 of the bonding layer, the foaming process and the evaporation process are carried out with respect to the foaming material included in the paste 560 of the bonding material by the steps S122 and S123 shown in FIG. 6 described above.

The foaming process and the evaporation process may be carried out simultaneously or, separately. When carrying out the foaming process and the evaporation process simultaneously, the foaming and evaporation of the foaming material occur by maintaining the stacked structure 160 of the honeycomb units 130 in a temperature range of approximately 80° C. to approximately 300° C. for a time of approximately 1 hour to approximately 5 hours, for example. On the other hand, when carrying out the foaming process and the evaporation process separately, the foaming of the foaming material occurs by maintaining the stacked structure 160 of the honeycomb units 130 in at a first temperature in a temperature range of approximately 80° C. to approximately 300° C. for a time of approximately 1 hour to approximately 5 hours, for example, and the evaporation of the foaming material occurs by maintaining the stacked structure 160 at a second temperature that is higher than the first temperature for a time of approximately 1 hour to approximately 5 hours, for example.

The paste 560 of the bonding layer is dried and solidified to form the bonding layer by the foaming process and the evaporation process carried out with respect to the foaming material.

Thereafter, a diamond cutter or the like is used to cut the outer peripheral portion of the stacked structure 160 into a desired dimension, so as to obtain the ceramic block 140 having the cylindrical shape, for example.

The honeycomb units which are molded bodies may be bonded by the bonding layer and fired so as to fire the bonding layer at the stage where the ceramic block 140 is formed. Alternatively, a 2-stage backing may be employed wherein the honeycomb units are bonded by the bonding layer and fired, and the ceramic block 140 is fired thereafter.

Step S130: Coating Layer Forming Process

Next, a coating layer is formed on the ceramic block 140.

First, a paste of the coating layer is formed on the outer peripheral surface, that is, the cut surface, of the ceramic block 140. Then, the paste of the coating layer is dried and solidified so as to form the coating layer.

Normally, the paste of the coating layer includes an inorganic fiber and/or inorganic particles, an inorganic binder and an organic binder.

For example, ceramic fibers or whiskers such as silica-alumina, mullite, alumina and silica fibers, may be used for the inorganic fiber. The inorganic fiber may be made up of one or a combination of two or more kinds of such ceramic fibers or whiskers. Among the ceramic fibers or whiskers, the silica-alumina fiber is desirably used as the inorganic fiber.

For example, carbides, nitrides and the like may be used for the inorganic particles. More particularly, inorganic powder or the like of silicon carbide, silicon nitride, arsenic nitride and the like may be used for the inorganic particles. The inorganic particles may be made up of one or a combination of two or more kinds of such inorganic particle materials. Among the inorganic particle materials, the silicon carbide having the good thermal conductivity is desirably used as the inorganic particles.

For example, silica sol, alumina and the like may be used for the inorganic binder. The inorganic binder may be made up of one or a combination of two or more kinds of such inorganic binder materials. Among the inorganic binder materials, the silica sol is desirably used as the inorganic binder.

For example, polyvinylalcohol, methylcellulose, ethylcellulose, carboxylmethyl-cellulose and the like may be used for the organic binder. The organic binder may be made up of one or a combination of two or more kinds of such organic binder materials. Among the organic binder materials, the carboxylmethylcellulose is desirably used as the organic binder.

The drying process with respect to the paste of the coating layer is carried out by maintaining the ceramic block 140 in a temperature range of approximately 80° C. to approximately 300° C. for a time of approximately 1 hour to approximately 5 hours, for example. The paste of the coating material may be the same as the paste of the bonding layer or, different from the paste of the bonding layer.

The honeycomb structure 100 in the embodiment of the present invention is produced by the processes described above.

When producing the honeycomb structure that is to be used as a catalyst carrier, it is possible to omit the process of sealing the end portion of the cells by the sealant. In addition, it is possible to add a process of making the cell wall of the honeycomb unit carry the catalyst. This process of making the cell wall of the honeycomb unit carry the catalyst may be carried out before the honeycomb units are stacked or, after the honeycomb units are stacked to form the ceramic block. For example, the process of making the cell wall of the honeycomb unit carry the catalyst may form an alumina layer, as the catalyst carrying layer, on the surface of the cell wall and providing a promoter and the catalyst such as platinum on the surface of the alumina layer.

In the description given heretofore, the micro pores are generated within the bonding layer when forming the honeycomb structure using the paste of the bonding layer that includes the foaming material. However, the embodiment of the present invention is not limited to such an application. In a case where the paste of the coating material includes the foaming material, for example, it is obvious to those skilled in the art that it becomes possible to form the coating layer that has a high strength and does not include macro pores.

Next, a more detailed description will be given of the effects according to the embodiment of the present invention by referring to examples and comparison examples.

Example Ex1

The honeycomb structure was produced in the following manner.

First, 7000 pts. wt. of an α-type silicon carbide powder having an average particle diameter of 10 μm and 3000 pts. wt. of an α-type silicon carbide powder having an average particle diameter of 0.5 μm were combined and mixed, and with respect to 1000 pts. wt. of the mixture that is obtained, 570 pts. wt. of an organic binder (methylcellulose) and 1770 pts. wt. of water were added and kneaded to obtain a mixture composition. With respect to this mixture composition, 330 pts. wt. of a plasticizer (UNILUBE manufactured by NOF Corporation) and 150 pts. wt. of a lubricant (glycerin) are added and further kneaded, before carrying out an extrusion molding to form a molded body of the honeycomb unit having the rectangular pillar shape shown in FIG. 2.

Next, a microwave drier or the like is used to dry the molded body, and then, a sealant paste having a similar composition as the molded body was applied to predetermined cells. Thereafter, the drier was used again to dry the molded body, and a degreasing was carried out at 400° C. The molded body was fired for 3 hours at 2200° C. in an argon environment at a normal pressure (or atmospheric pressure), so as to produce the honeycomb unit that is made up of the silicon carbide sintered body. The dimensions of this honeycomb unit was 34.3 mm in height, 34.3 mm in width and 150 mm in length, with a porosity of 42% and an average pore diameter of 11 μm. The number cells was 46.5 cells/cm$^2$ (300 cpsi), and the thickness of the cell wall 23 was 0.25 mm.

Next, a total of 4 spacers, that have the same composition as the bonding layer and was dried and solidified, were placed in vicinities of the four corresponding corners of the side surface of the honeycomb unit. More particularly, each spacer was placed at a position so that the minimum distance between the outer peripheral portion of the spacer and the two sides forming the corresponding corner of the side surface of the honeycomb unit becomes 6.5 mm. The dimension of each spacer was 5 mm in diameter and 1 mm in thickness. Thereafter, 4 honeycomb units arranged in the vertical direction and 4 honeycomb units arranged in the horizontal direction were bonded together by interposing the spacers, so as to assemble the stacked structure made up of the honeycomb units.

Next, a paste of the bonding layer was adjusted by adding 0.5 wt. % of microcapsules to a mixture solution that includes 20 wt. % of silicon carbide particles having an average particle diameter of 0.6 μm, 26 wt. % of silica sol (30% solid), 1 wt. % of carboxylmethylcellulose (CMC), 30 wt. % of alumina balloons and 23 wt. % of water. In addition, a paste of the coating layer was adjusted to a composition similar to that of the paste of the bonding layer. The microcapsules used had isobutene gas sealed within the capsules of a thermoplastic organic material (acrylonitrile) having a diameter in a range of 10 μm to 50 μm with an optimal blowing rate of approximately 4 times. The microcapsule content added to the paste of the bonding layer was 0.5 wt. %.

Next, the filler dispenser shown in FIGS. 8 and 9 was used to fill the paste of the bonding material into the spaces in the stacked structure of the honeycomb units. The paste from the first paste supplying unit 503*a* was injected with a pressure of 1.1 kg/cm$^2$, and the paste from the second paste supplying unit 503*b* was injected with a zero pressure.

Thereafter, the stacked structure of the honeycomb units was maintained at 100° C. for 1 hour, to thereby foam and evaporate the foaming material within the paste and to solidify the bonding layer. The bonding layer had a thickness of 1 mm.

Next, the outer peripheral surface of the ceramic block obtained in this manner was cut by a diamond cutter so that the outer peripheral shape (cross sectional shape) of the ceramic block becomes a circle having a diameter of 145 mm.

Then, the paste of the coating layer was applied on the cut outer peripheral surface of the ceramic block. The ceramic block was maintained at 100° C. for 1 hour, to thereby foam and evaporate the foaming material within the paste and to solidify the coating layer. The coating layer had a thickness of 1 mm.

With respect to the honeycomb structure of this example Ex1 obtained by the above described process, the following measurements were made of the bubble marks formed within the bonding layer and within the coating layer.

Figure 12:
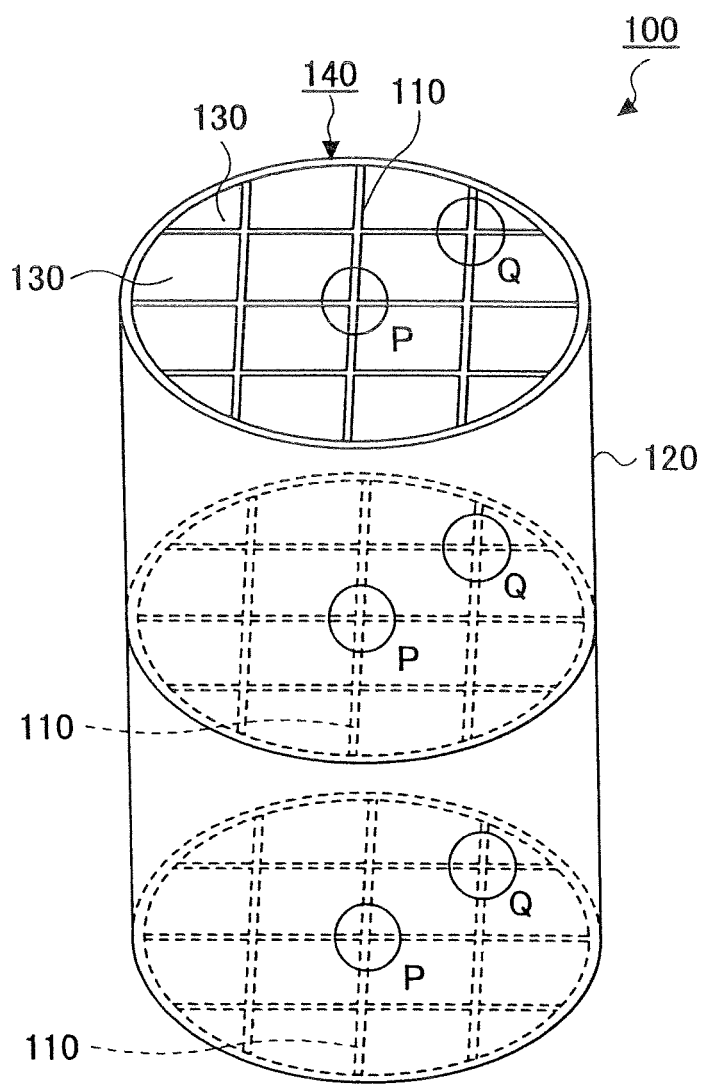
FIG. 12 is a diagram showing locations where dimensions of bubble marks in the bonding layer were measured.

Measurement of Bubble Mark Size:

The bubble mark size in the bonding layer was measured at the 6 locations shown in FIG. 12. FIG. 12 is a diagram showing locations where the dimensions of the bubble marks in the bonding layer were measured. First, the honeycomb structure was equally divided into two along a division plane perpendicular to the longitudinal direction of the honeycomb structure, and the two end surfaces of the honeycomb structure and the division plane (that is, center plane) were used as measuring surfaces. On each of the three measuring surfaces, the measuring point was set to a position P shown in FIG. 12 where the bonding layer portions intersect at the central portion of the measuring surface, and an arbitrary position Q shown in FIG. 12 where the bonding layer portions intersect at the peripheral portion of the measuring surface (that is, deviated from the central portion and closer to the periphery of the measuring surface).

Figure 13:
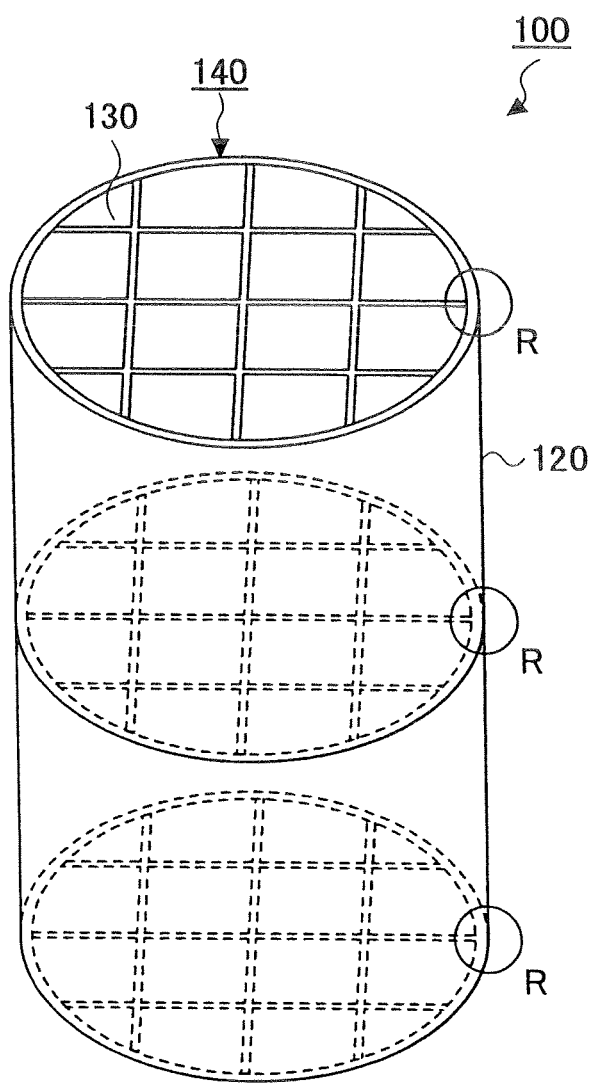
FIG. 13 is a diagram showing locations where dimensions of bubble marks in a coating layer were measured.

Similarly, the bubble mark size in the coating layer was measured at the 3 locations shown in FIG. 13. FIG. 13 is a diagram showing locations where the dimensions of the bubble marks in the coating layer were measured. First, the honeycomb structure was equally divided into two along a division plane perpendicular to the longitudinal direction of the honeycomb structure, and the two end surfaces of the honeycomb structure and the division plane (that is, center plane) were used as measuring surfaces. On each of the three measuring surfaces, the measuring point was set to an arbitrary position R shown in FIG. 13 at the outer peripheral portion of the measuring surface.

Next, a microscope was used to measure the size of the bubble marks at the 6 measuring positions P and Q for the bonding layer and at the 3 measuring positions R for the coating layer. 10 bubble marks made up of the largest 5 bubble marks and the smallest 5 bubble marks were selected from the measured bubble marks, for each of the bonding layer and the coating layer. In the case of an oval bubble mark, the longer was regarded as its size.

The results of the measurement are shown in FIG. 14. FIG. 14 is a diagram showing a table of the measured results obtained for the examples and the comparison examples. For the honeycomb structure of the example Ex1, it may be seen from FIG. 14 that all of the 10 selected bubble marks measured in the bonding layer had a size in a range of 100 μm to 300 μm. Similarly, it may be seen from FIG. 14 that all of the 10 selected bubble marks measured in the coating layer had a size in a range of 100 μm to 300 μm.

Example Ex2

The honeycomb unit of the example Ex2 was made by a method similar to that used for the example Ex1. But for the example Ex2, the bonding layer and the coating layer were formed by adjusting the paste of the bonding layer and the paste of the coating layer respectively added with 1.0 wt. % of microcapsules. Other conditions for making the example Ex2 were set the same as those for making the example Ex1.

For the honeycomb structure of the example Ex2, it may be seen from FIG. 14 that all of the 10 selected bubble marks measured in the bonding layer had a size in a range of 100 μm to 300 μm. Similarly, it may be seen from FIG. 14 that all of the 10 selected bubble marks measured in the coating layer had a size in a range of 100 μm to 300 μm.

Example Ex3

The honeycomb unit of the example Ex3 was made by a method similar to that used for the example Ex1. But for the example Ex3, the bonding layer and the coating layer were formed by adjusting the paste of the bonding layer and the paste of the coating layer respectively added with 4.0 wt. % of microcapsules. Other conditions for making the example Ex3 were set the same as those for making the example Ex1.

For the honeycomb structure of the example Ex3, it may be seen from FIG. 14 that all of the 10 selected bubble marks measured in the bonding layer had a size in a range of 100 μm to 300 μm. Similarly, it may be seen from FIG. 14 that all of the 10 selected bubble marks measured in the coating layer had a size in a range of 100 μm to 300 μm.

Example Ex4

The honeycomb unit of the example Ex4 was made by a method similar to that used for the example Ex1. But for the example Ex4, the bonding layer and the coating layer were formed by adjusting the paste of the bonding layer and the paste of the coating layer respectively added with 8.0 wt. % of microcapsules. Other conditions for making the example Ex4 were set the same as those for making the example Ex1.

For the honeycomb structure of the example Ex4, it may be seen from FIG. 14 that all of the 10 selected bubble marks measured in the bonding layer had a size in a range of 100 μm to 300 μm. Similarly, it may be seen from FIG. 14 that all of the 10 selected bubble marks measured in the coating layer had a size in a range of 100 μm to 300 μm.

Example Ex5

The honeycomb unit of the example Ex5 was made by a method similar to that used for the example Ex1. But for the example Ex5, the bonding layer and the coating layer were formed by adjusting the paste of the bonding layer and the paste of the coating layer respectively added with 10.0 wt. % of microcapsules. Other conditions for making the example Ex5 were set the same as those for making the example Ex1.

For the honeycomb structure of the example Ex5, it may be seen from FIG. 14 that all of the 10 selected bubble marks measured in the bonding layer had a size in a range of 100 μm to 300 μm. Similarly, it may be seen from FIG. 14 that all of the 10 selected bubble marks measured in the coating layer had a size in a range of 100 μm to 300 μm.

Example Ex6

The honeycomb unit of the example Ex6 was made by a method similar to that used for the example Ex1. But for the example Ex6, the bonding layer and the coating layer were formed by adjusting the paste of the bonding layer and the paste of the coating layer respectively added with 15.0 wt. % of microcapsules. Other conditions for making the example Ex6 were set the same as those for making the example Ex1.

For the honeycomb structure of the example Ex6, it may be seen from FIG. 14 that all of the 10 selected bubble marks measured in the bonding layer had a size in a range of 100 μm to 300 μm. Similarly, it may be seen from FIG. 14 that all of the 10 selected bubble marks measured in the coating layer had a size in a range of 100 μm to 300 μm.

Example Ex7

The honeycomb unit of the example Ex7 was made by a method similar to that used for the example Ex1. But for the example Ex7, the bonding layer and the coating layer were formed by adjusting the paste of the bonding layer and the paste of the coating layer respectively added with 0.5 wt. % of foaming AS resin (acrylonitrile-styrene copolymer) having an optimal blowing rate of 5 times to 10 times. Other conditions for making the example Ex2 were set the same as those for making the example Ex1.

For the honeycomb structure of the example Ex7, it may be seen from FIG. 14 that all of the 10 selected bubble marks measured in the bonding layer had a size in a range of 100 μm to 300 μm. Similarly, it may be seen from FIG. 14 that all of the 10 selected bubble marks measured in the coating layer had a size in a range of 100 μm to 300 μm.

Example Ex8

The honeycomb unit of the example Ex8 was made by a method similar to that used for the example Ex1. But for the example Ex8, the bonding layer and the coating layer were formed by adjusting the paste of the bonding layer and the paste of the coating layer respectively added with 4.0 wt. % of the foaming material used in the example Ex7. Other conditions for making the example Ex8 were set the same as those for making the example Ex1.

For the honeycomb structure of the example Ex8, it may be seen from FIG. 14 that all of the 10 selected bubble marks measured in the bonding layer had a size in a range of 100 μm to 300 μm. Similarly, it may be seen from FIG. 14 that all of the 10 selected bubble marks measured in the coating layer had a size in a range of 100 μm to 300 μm.

Example Ex9

The honeycomb unit of the example Ex9 was made by a method similar to that used for the example Ex1. But for the example Ex9, the bonding layer and the coating layer were formed by adjusting the paste of the bonding layer and the paste of the coating layer respectively added with 10.0 wt. % of the foaming material used in the example Ex7. Other conditions for making the example Ex9 were set the same as those for making the example Ex1.

For the honeycomb structure of the example Ex9, it may be seen from FIG. 14 that all of the 10 selected bubble marks measured in the bonding layer had a size in a range of 100 μm to 300 μm. Similarly, it may be seen from FIG. 14 that all of the 10 selected bubble marks measured in the coating layer had a size in a range of 100 μm to 300 μm.

Comparison Example CEx1

The honeycomb unit of the comparison example CEx1 was made by a method similar to that used for the example Ex1. But for the comparison example CEx1, no foaming material was added to the paste of the bonding layer and the paste of the coating layer. Other conditions for making the comparison example CEx1 were set the same as those for making the example Ex1.

For the honeycomb structure of the comparison example CEx1, it may be seen from FIG. 14 that of the 10 selected bubble marks measured in the bonding layer, the largest bubble mark had a size exceeding 900 μm. Similarly, it may be seen from FIG. 14 that of the 10 selected bubble marks measured in the coating layer, the largest bubble mark had a size exceeding 900 μm.

Comparison Sample CEx2

The honeycomb unit of the comparison example CEx2 was made by a method similar to that used for the example Ex1. But for the comparison example CEx2, the bonding layer and the coating layer were formed by adjusting the paste of the bonding layer and the paste of the coating layer respectively added with 1.0 wt. % of microcapsules having a particle diameter in a range of 60 μm to 100 μm. Other conditions for making the comparison example CEx2 were set the same as those for making the example Ex1.

For the honeycomb structure of the comparison example CEx2, it may be seen from FIG. 14 that of the 10 selected bubble marks measured in the bonding layer, some bubble marks had a size in a range of 100 μm to 300 μm, but the largest bubble marks were in a range of 500 μm to 700 μm. Similarly, it may be seen from FIG. 14 that of the selected bubble marks measured in the coating layer, some bubble marks had a size in a range of 100 μm to 300 μm, but the largest bubble marks were in a range of 500 μm to 700 μm.

Comparison Example CEx3

The honeycomb unit of the comparison example CEx3 was made by a method similar to that used for the example Ex1. But for the comparison example CEx3, the bonding layer and the coating layer were formed by adjusting the paste of the bonding layer and the paste of the coating layer respectively added with 1.0 wt. % of microcapsules having a particle diameter in a range of 100 μm to 150 μm. Other conditions for making the comparison example CEx3 were set the same as those for making the example Ex1.

For the honeycomb structure of the comparison example CEx3, it may be seen from FIG. 14 that of the 10 selected bubble marks measured in the bonding layer, the largest bubble mark had a size exceeding 900 μm. Similarly, it may be seen from FIG. 14 that of the 10 selected bubble marks measured in the coating layer, the largest bubble mark had a size exceeding 900 μm.

From the measured results for the comparison examples CEx2 and CEx3, it was confirmed that the particle diameter of the foaming material that is added to the paste of the bonding layer and the paste of the coating layer is desirably 50 μm or less in order to obtain the effects according to the embodiment of the present invention.

3-Point Bending Strength Measurement:

For each of the examples Ex1, Ex3, Ex5 and Ex6 and the comparison examples CEx1, CEx2 and CEx3, two honeycomb units were stacked using the respective paste of the bonding layer, maintained at 100° C. for 1 hour, and the foaming material within the paste was foaming and evaporated to solidify the bonding layer. The resulting bonding layer had a thickness of 1 mm.

The measurement of the 3-point bending strength was made using a measuring apparatus model 5583 manufactured by Instron based on JIS-R1601.

The cross head velocity was set to 0.5 mm/min, the span distance was set to 125 mm, and the breaking load was measured by applying the weight in a perpendicular direction with respect to the bonding layer at a center position along the longitudinal direction of the bonded honeycomb units.

The measured results for this 3-point bending strength measurement are also shown in FIG. 14. It may be seen from FIG. 14 that the breaking load was 18.2 kgf, 22.0 kgf and 24.6 kgf for the examples Ex1, Ex3 and Ex5. On the other hand, the breaking load was 9.0 kgf, 8.5 kgf and 7.6 kgf for the comparison examples CEx1, CEx2 and CEx3. It was confirmed that the bonding strength is high in the case of the examples Ex1, Ex3 and Ex5 when compared to that of the comparison examples CEx1, CEx2 and CEx3. The breaking load was 14.9 kgf for the example Ex6, and the bonding strength in this case was lower than those of the examples Ex1, Ex3 and Ex5. It may be regarded that the lower bonding strength observed for the example Ex6 is due to the larger amount of foaming material that is added and the large number of micro pores.

The contents of JIS-R1601 are incorporated herein by reference in their entirety.

Further, the present invention is not limited to these embodiments, but various variations and modifications may be made without departing from the scope of the present invention.

What is claimed is:

1. A method of producing a honeycomb structure, comprising:
    forming a ceramic block by bonding a plurality of honeycomb units that have a plurality of cells partitioned by cell walls using a bonding layer made of a bonding material, or forming a ceramic block by a single honeycomb unit that has a plurality of cells partitioned by cell walls and providing a coating layer made of a coating material on an outer peripheral portion of the ceramic block;
    providing a paste of at least one of the bonding and coating materials which includes particles of a foaming material on the outer peripheral portion of the ceramic block;
    blowing the foaming material, said foaming material having a coefficient of expansion in a range of approximately 2 times to approximately 10 times and the particles of the foaming material having a diameter in a range of approximately 1 μm to approximately 50 μm, so that the particles have a diameter less than approximately 500 μm after said blowing; and
    evaporating the foaming material and forming bubble marks having a diameter in a range of approximately 100 μm to approximately 300 μm in the bonding layer and/or the coating layer, so that the bonding layer and/or the coating layer includes only bubble marks having diameters that are approximately 300 μm or less, and the diameter of each of the bubble marks in the bonding layer and/or the coating layer after said evaporating is in a range of approximately 100 μm to approximately 300 μm.

2. The method of producing the honeycomb structure as claimed in claim 1, wherein an average particle diameter of the particles of the foaming material is in a range of approximately 5 μm to approximately 50 μm.

3. The method of producing the honeycomb structure as claimed in claim 1, wherein the paste of the bonding layer includes approximately 0.5 wt. % to approximately 10 wt. % of the particles of the foaming material.

4. The method of producing the honeycomb structure as claimed in claim 1, wherein the particles of the foaming material expand to approximately 2 times to approximately 50 times by volume ratio.

5. The method of producing the honeycomb structure as claimed in claim 1, wherein the particles of the foaming material expand to approximately 2 times to approximately 10 times by volume ratio.

6. The method of producing the honeycomb structure as claimed in claim 1, wherein the foaming material includes microcapsules.

7. The method of producing the honeycomb structure as claimed in claim 6, wherein the microcapsules are formed by low-boiling-temperature hydrocarbon or carbon dioxide gas encapsulated by a resin.

8. The method of producing the honeycomb structure as claimed in claim 1, wherein the foaming material includes a foaming resin, an inorganic foaming material or an inflating agent.

9. The method of producing the honeycomb structure as claimed in claim 1, wherein said blowing the foaming material is carried out in a temperature range of approximately 80° C. to approximately 300° C.

10. The method of producing the honeycomb structure as claimed in claim 9, wherein said blowing the foaming material is carried out in a temperature range of approximately 90° C. to approximately 150° C.

11. The method of producing the honeycomb structure as claimed in claim 1, wherein the paste of the bonding layer further includes an inorganic fiber and an inorganic binder.

12. The method of producing the honeycomb structure as claimed in claim 1, wherein the paste of the coating material further includes an inorganic fiber and/or inorganic particles, an inorganic binder and an organic binder.

13. The method of producing the honeycomb structure as claimed in claim 1, wherein the ceramic block forms a stacked structure made up of honeycomb units that are stacked by interposing spacers, and further comprising:
   filling up the paste of the bonding material into a space formed in the honeycomb units by the spacers.

14. The method of producing the honeycomb structure as claimed in claim 1, wherein each of the plurality of cells has two end portions, and further comprising:
   sealing one of the two end portions of each of the plurality of cells.

15. The method of producing the honeycomb structure as claimed in claim 1, further comprising:
   providing a catalyst on each of the cell walls.

\* \* \* \* \*